(12) United States Patent
Kim

(10) Patent No.: US 11,055,734 B2
(45) Date of Patent: *Jul. 6, 2021

(54) SYSTEMS AND METHODS OF USING A COMMUNICATION NETWORK TO COORDINATE PROCESSING AMONG A PLURALITY OF SEPARATE COMPUTING SYSTEMS

(71) Applicant: Visa International Service Association, San Francisco, CA (US)

(72) Inventor: Nancy L. Kim, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 88 days.

This patent is subject to a terminal disclaimer.

(21) Appl. No.: 16/555,409

(22) Filed: Aug. 29, 2019

(65) Prior Publication Data

US 2019/0385186 A1    Dec. 19, 2019

Related U.S. Application Data

(63) Continuation of application No. 14/803,972, filed on Jul. 20, 2015.

(Continued)

(51) Int. Cl.
*G06Q 30/02* (2012.01)
*G06Q 20/38* (2012.01)
(Continued)

(52) U.S. Cl.
CPC ....... *G06Q 30/0226* (2013.01); *G06Q 20/385* (2013.01); *G06Q 20/387* (2013.01);
(Continued)

(58) Field of Classification Search
None
See application file for complete search history.

(56) References Cited

U.S. PATENT DOCUMENTS

| 4,906,826 A | 3/1990 | Spencer |
| 4,914,590 A | 4/1990 | Loatman et al. |

(Continued)

FOREIGN PATENT DOCUMENTS

| CN | 101390121 A | 3/2009 |
| CN | 102804219 A | 11/2012 |

(Continued)

OTHER PUBLICATIONS

E. Visa, "Visa How-To's for Restaurant Owners and Managers Tools and Best Practices for More Efficient Handling of Visa Card Transactions", available on Dec. 15, 2008, retrieved from https://usa.visa.com/dam/VCOM/download/merchants/rest_own_mgr.pdf (Year: 2008).*

(Continued)

*Primary Examiner* — Sam Refai
(74) *Attorney, Agent, or Firm* — The Webb Law Firm

(57) ABSTRACT

A communication portal coupled with a processing system and a host having a first resource. The processing system has a second resource addressable by a terminal using a predetermined communication protocol. The communication portal receives a first communication from a terminal identifying the first resource. In response, the communication portal identifies the second resource, stores a data record associating the first resource and the second resource, and provides a response to the first communication to identify the second resource. The terminal then uses the communication protocol adapted for the second resource as a way to request an operation on the first resource. The portal communicates with the processing system to identify a request for an operation on the second resource and in response, commu- (Continued)

nicates with the host to perform a second operation on the first resource based on the stored data record associating the first resource and the second resource.

20 Claims, 9 Drawing Sheets

Related U.S. Application Data

(60) Provisional application No. 62/028,038, filed on Jul. 23, 2014.

(51) Int. Cl.
*G06Q 20/40* (2012.01)
*H04L 12/911* (2013.01)

(52) U.S. Cl.
CPC ........ *G06Q 20/405* (2013.01); *G06Q 30/0207* (2013.01); *H04L 47/70* (2013.01)

(56) References Cited

U.S. PATENT DOCUMENTS

| | | |
|---|---|---|
| 5,025,372 A | 6/1991 | Burton et al. |
| 5,401,946 A | 3/1995 | Weinblatt |
| 5,592,560 A | 1/1997 | Deaton et al. |
| 5,621,812 A | 4/1997 | Deaton et al. |
| 5,638,457 A | 6/1997 | Deaton et al. |
| 5,684,990 A | 11/1997 | Boothby |
| 5,687,322 A | 11/1997 | Deaton et al. |
| 5,710,886 A | 1/1998 | Christensen et al. |
| 5,924,080 A | 7/1999 | Johnson |
| 5,974,396 A | 10/1999 | Anderson et al. |
| 6,018,723 A | 1/2000 | Siegel et al. |
| 6,035,280 A | 3/2000 | Christensen |
| 6,055,573 A | 4/2000 | Gardenswartz et al. |
| 6,061,660 A | 5/2000 | Eggleston et al. |
| 6,065,675 A | 5/2000 | Teicher |
| 6,070,147 A | 5/2000 | Harms et al. |
| 6,101,484 A | 8/2000 | Halbert et al. |
| 6,119,101 A | 9/2000 | Peckover |
| 6,119,933 A | 9/2000 | Wong et al. |
| 6,216,129 B1 | 4/2001 | Eldering |
| 6,226,642 B1 | 5/2001 | Beranek et al. |
| 6,282,516 B1 | 8/2001 | Giuliani |
| 6,282,522 B1 | 8/2001 | Davis et al. |
| 6,285,983 B1 | 9/2001 | Jenkins |
| 6,298,330 B1 | 10/2001 | Gardenswartz et al. |
| 6,307,958 B1 | 10/2001 | Deaton et al. |
| 6,321,201 B1 | 11/2001 | Dahl |
| 6,324,519 B1 | 11/2001 | Eldering |
| 6,327,574 B1 | 12/2001 | Kramer et al. |
| 6,332,126 B1 | 12/2001 | Peirce et al. |
| 6,334,110 B1 | 12/2001 | Walter et al. |
| 6,377,935 B1 | 4/2002 | Deaton et al. |
| 6,450,407 B1 | 9/2002 | Freeman et al. |
| 6,487,538 B1 | 11/2002 | Gupta et al. |
| 6,505,168 B1 | 1/2003 | Rothman et al. |
| 6,519,571 B1 | 2/2003 | Guheen et al. |
| 6,598,030 B1 | 7/2003 | Siegel et al. |
| 6,604,089 B1 | 8/2003 | Van Horn et al. |
| 6,604,239 B1 | 8/2003 | Kohen |
| 6,631,356 B1 | 10/2003 | Van Horn et al. |
| 6,631,372 B1 | 10/2003 | Graham |
| 6,742,003 B2 | 5/2004 | Beckerman et al. |
| 6,834,110 B1 | 12/2004 | Marconcini et al. |
| 6,856,992 B2 | 2/2005 | Britton et al. |
| 6,901,406 B2 | 5/2005 | Nabe et al. |
| 6,922,686 B2 | 7/2005 | Okamoto et al. |
| 6,934,508 B2 | 8/2005 | Ceresoli et al. |
| 6,934,690 B1 | 8/2005 | Van Horn et al. |
| 6,938,022 B1 | 8/2005 | Singhal |
| 6,941,376 B2 | 9/2005 | Mitchell et al. |
| 6,996,560 B1 | 2/2006 | Choi et al. |
| 7,003,476 B1 | 2/2006 | Samra |
| 7,024,374 B1 | 4/2006 | Day et al. |
| 7,024,409 B2 | 4/2006 | Iyengar |
| 7,035,855 B1 | 4/2006 | Kilger et al. |
| 7,039,599 B2 | 5/2006 | Merriman et al. |
| 7,062,510 B1 | 6/2006 | Eldering |
| 7,072,847 B2 | 7/2006 | Ulenas et al. |
| 7,107,230 B1 | 9/2006 | Halbert et al. |
| 7,107,249 B2 | 9/2006 | Dively et al. |
| 7,120,590 B1 | 10/2006 | Eisen et al. |
| 7,124,099 B2 | 10/2006 | Mesaros |
| 7,143,143 B1 | 11/2006 | Thompson |
| 7,146,330 B1 | 12/2006 | Alon et al. |
| 7,158,943 B2 | 1/2007 | van der Riet |
| 7,158,955 B2 | 1/2007 | Diveley et al. |
| 7,162,436 B1 | 1/2007 | Eckel, Jr. |
| 7,165,037 B2 | 1/2007 | Lazarus et al. |
| 7,177,822 B2 | 2/2007 | Mahmood et al. |
| 7,181,412 B1 | 2/2007 | Fulgoni et al. |
| 7,181,419 B1 | 2/2007 | Mesaros |
| 7,194,422 B1 | 3/2007 | St. John Killick |
| 7,194,427 B1 | 3/2007 | Van Horn et al. |
| 7,225,142 B1 | 5/2007 | Apte et al. |
| 7,260,837 B2 | 8/2007 | Abraham et al. |
| 7,263,498 B1 | 8/2007 | Van Horn et al. |
| 7,264,152 B2 | 9/2007 | Tsuei et al. |
| 7,269,578 B2 | 9/2007 | Sweeney |
| 7,299,194 B1 | 11/2007 | Manganaris et al. |
| 7,328,169 B2 | 2/2008 | Temares et al. |
| 7,333,998 B2 | 2/2008 | Heckerman et al. |
| 7,337,127 B1 | 2/2008 | Smith et al. |
| 7,340,438 B2 | 3/2008 | Nordman et al. |
| 7,359,866 B2 | 4/2008 | Farat |
| 7,360,251 B2 | 4/2008 | Spalink et al. |
| 7,363,246 B1 | 4/2008 | Van Horn et al. |
| 7,373,311 B2 | 5/2008 | Lambert et al. |
| 7,398,225 B2 | 7/2008 | Voltmer et al. |
| 7,398,226 B2 | 7/2008 | Haines et al. |
| 7,401,731 B1 | 7/2008 | Pletz et al. |
| 7,415,537 B1 | 8/2008 | Maes |
| 7,424,439 B1 | 9/2008 | Fayyad et al. |
| 7,424,441 B2 | 9/2008 | George et al. |
| 7,428,498 B2 | 9/2008 | Voltmer et al. |
| 7,444,658 B1 | 10/2008 | Matz et al. |
| 7,480,627 B1 | 1/2009 | Van Horn et al. |
| 7,490,052 B2 | 2/2009 | Kilger et al. |
| 7,493,655 B2 | 2/2009 | Brown |
| 7,496,524 B2 | 2/2009 | Voltmer et al. |
| 7,526,485 B2 | 4/2009 | Hagan et al. |
| 7,533,038 B2 | 5/2009 | Blume et al. |
| 7,533,130 B2 | 5/2009 | Narayana et al. |
| 7,536,360 B2 | 5/2009 | Stolfo et al. |
| 7,552,069 B2 | 6/2009 | Kepecs |
| 7,562,030 B1 | 7/2009 | Shapira et al. |
| 7,578,430 B2 | 8/2009 | Michelsen et al. |
| 7,578,435 B2 | 8/2009 | Suk |
| 7,593,871 B1 | 9/2009 | Mesaros |
| 7,613,628 B2 | 11/2009 | Ariff et al. |
| 7,613,629 B2 | 11/2009 | Antonucci et al. |
| 7,624,184 B1 | 11/2009 | Aviani et al. |
| 7,689,463 B1 | 3/2010 | Mesaros |
| 7,689,469 B1 | 3/2010 | Mesaros |
| 7,693,748 B1 | 4/2010 | Mesaros |
| 7,729,945 B1 | 6/2010 | Katz et al. |
| 7,729,977 B2 | 6/2010 | Xiao et al. |
| 7,747,473 B1 | 6/2010 | Mesaros |
| 7,752,134 B2 | 7/2010 | Spear |
| 7,828,206 B2 | 11/2010 | Hessburg et al. |
| 7,904,337 B2 | 3/2011 | Morsa |
| 7,917,388 B2 | 3/2011 | van der Riet |
| 7,933,841 B2 | 4/2011 | Schmeyer et al. |
| 7,953,219 B2 | 5/2011 | Freedman et al. |
| 8,050,968 B2 | 11/2011 | Antonucci et al. |
| 8,055,536 B1 | 11/2011 | Olaiya et al. |
| 8,103,545 B2 | 1/2012 | Ramer et al. |
| 8,131,875 B1 | 3/2012 | Chen et al. |
| 8,140,389 B2 | 3/2012 | Altberg et al. |
| 8,313,023 B1 | 11/2012 | McGhie et al. |
| 8,342,399 B1 | 1/2013 | McGhie et al. |

(56) References Cited

U.S. PATENT DOCUMENTS

| | | |
|---|---|---|
| 8,387,858 B2 | 3/2013 | Bohn et al. |
| 8,511,550 B1 | 8/2013 | McGhie et al. |
| 8,612,290 B2 | 12/2013 | Postrel |
| 2001/0027413 A1 | 10/2001 | Bhutta |
| 2001/0049620 A1 | 12/2001 | Blasko |
| 2002/0004733 A1 | 1/2002 | Addante |
| 2002/0019768 A1 | 2/2002 | Fredrickson et al. |
| 2002/0032602 A1 | 3/2002 | Lanzillo, Jr. et al. |
| 2002/0032904 A1 | 3/2002 | Lemer |
| 2002/0042738 A1 | 4/2002 | Srinivasan et al. |
| 2002/0046187 A1 | 4/2002 | Vargas et al. |
| 2002/0053076 A1 | 5/2002 | Landesmann |
| 2002/0059100 A1 | 5/2002 | Shore |
| 2002/0065723 A1 | 5/2002 | Anderson et al. |
| 2002/0072931 A1 | 6/2002 | Card |
| 2002/0095387 A1 | 7/2002 | Sosa et al. |
| 2002/0099649 A1 | 7/2002 | Lee et al. |
| 2002/0107738 A1 | 8/2002 | Beach et al. |
| 2002/0123928 A1 | 9/2002 | Eldering et al. |
| 2002/0128908 A1 | 9/2002 | Levin et al. |
| 2002/0133400 A1 | 9/2002 | Terry |
| 2002/0133405 A1 | 9/2002 | Newnam et al. |
| 2002/0138346 A1 | 9/2002 | Kodaka et al. |
| 2002/0147645 A1 | 10/2002 | Alao et al. |
| 2002/0161625 A1 | 10/2002 | Brito-Valladares et al. |
| 2002/0174013 A1 | 11/2002 | Freeman et al. |
| 2002/0194137 A1 | 12/2002 | Park et al. |
| 2003/0004808 A1 | 1/2003 | Elhaoussine et al. |
| 2003/0018652 A1 | 1/2003 | Beckerman et al. |
| 2003/0047602 A1 | 3/2003 | Iida et al. |
| 2003/0074267 A1 | 4/2003 | Acharya et al. |
| 2003/0078864 A1 | 4/2003 | Hardesty et al. |
| 2003/0115113 A1 | 6/2003 | Duncan |
| 2003/0144935 A1 | 7/2003 | Sobek |
| 2003/0191832 A1 | 10/2003 | Satyavolu et al. |
| 2004/0019518 A1 | 1/2004 | Abraham et al. |
| 2004/0024632 A1 | 2/2004 | Perry |
| 2004/0054577 A1 | 3/2004 | Inoue et al. |
| 2004/0054581 A1 | 3/2004 | Redford et al. |
| 2004/0054591 A1 | 3/2004 | Spaeth et al. |
| 2004/0073482 A1 | 4/2004 | Wiggins et al. |
| 2004/0099730 A1 | 5/2004 | Tuchler et al. |
| 2004/0122735 A1 | 6/2004 | Meshkin |
| 2004/0122736 A1 | 6/2004 | Strock et al. |
| 2004/0127192 A1 | 7/2004 | Ceresoli et al. |
| 2004/0133474 A1 | 7/2004 | Tami et al. |
| 2004/0181554 A1 | 9/2004 | Heckerman et al. |
| 2004/0193489 A1 | 9/2004 | Boyd et al. |
| 2004/0193685 A1 | 9/2004 | Proehl |
| 2004/0225509 A1 | 11/2004 | Andre |
| 2004/0225603 A1 | 11/2004 | Allen et al. |
| 2004/0249650 A1 | 12/2004 | Freedman et al. |
| 2004/0249710 A1 | 12/2004 | Smith et al. |
| 2005/0055275 A1 | 3/2005 | Newman et al. |
| 2005/0071225 A1 | 3/2005 | Bortolin et al. |
| 2005/0071227 A1 | 3/2005 | Hammad et al. |
| 2005/0071230 A1 | 3/2005 | Mankoff |
| 2005/0131762 A1 | 6/2005 | Bharat et al. |
| 2005/0131792 A1 | 6/2005 | Rowe |
| 2005/0160002 A1 | 7/2005 | Roetter et al. |
| 2005/0160003 A1 | 7/2005 | Berardi et al. |
| 2005/0216823 A1 | 9/2005 | Petersen et al. |
| 2005/0235310 A1 | 10/2005 | Bies |
| 2005/0251446 A1 | 11/2005 | Jiang et al. |
| 2006/0053056 A1 | 3/2006 | Alspach-Goss et al. |
| 2006/0069619 A1 | 3/2006 | Walker et al. |
| 2006/0103667 A1 | 5/2006 | Amit et al. |
| 2006/0143071 A1 | 6/2006 | Hofmann |
| 2006/0143075 A1 | 6/2006 | Carr et al. |
| 2006/0161527 A1 | 7/2006 | Dwork et al. |
| 2006/0167818 A1 | 7/2006 | Wentker et al. |
| 2006/0178957 A1 | 8/2006 | LeClaire |
| 2006/0190337 A1 | 8/2006 | Ayers et al. |
| 2006/0218038 A1 | 9/2006 | Grider |
| 2006/0224454 A1 | 10/2006 | Kantor et al. |
| 2006/0230053 A1 | 10/2006 | Eldering |
| 2006/0253320 A1 | 11/2006 | Heywood |
| 2006/0253323 A1 | 11/2006 | Phan et al. |
| 2006/0259362 A1 | 11/2006 | Cates |
| 2006/0265280 A1 | 11/2006 | Nakada et al. |
| 2006/0265429 A1 | 11/2006 | Pendergast et al. |
| 2006/0287916 A1 | 12/2006 | Starr et al. |
| 2006/0293948 A1 | 12/2006 | Weinblatt |
| 2007/0033104 A1 | 2/2007 | Collins et al. |
| 2007/0038516 A1 | 2/2007 | Apple et al. |
| 2007/0055597 A1 | 3/2007 | Patel et al. |
| 2007/0061256 A1 | 3/2007 | Park et al. |
| 2007/0067267 A1 | 3/2007 | Ives |
| 2007/0067297 A1 | 3/2007 | Kublickis |
| 2007/0084917 A1 | 4/2007 | Fajkowski |
| 2007/0100691 A1 | 5/2007 | Patterson |
| 2007/0124201 A1 | 5/2007 | Hu et al. |
| 2007/0129963 A1 | 6/2007 | Skibinski et al. |
| 2007/0156517 A1 | 7/2007 | Kaplan et al. |
| 2007/0162377 A1 | 7/2007 | Williams |
| 2007/0174295 A1 | 7/2007 | Abraham et al. |
| 2007/0179846 A1 | 8/2007 | Jain et al. |
| 2007/0192121 A1 | 8/2007 | Routson |
| 2007/0192122 A1 | 8/2007 | Routson et al. |
| 2007/0219865 A1 | 9/2007 | Leining |
| 2007/0219866 A1 | 9/2007 | Wolf et al. |
| 2007/0226056 A1 | 9/2007 | Belanger et al. |
| 2007/0226061 A1 | 9/2007 | Chen et al. |
| 2007/0239532 A1 | 10/2007 | Benson et al. |
| 2007/0244741 A1 | 10/2007 | Blume et al. |
| 2007/0260521 A1 | 11/2007 | Van Der Riet |
| 2007/0260736 A1 | 11/2007 | Miller |
| 2007/0265923 A1 | 11/2007 | Krassner et al. |
| 2007/0282681 A1 | 12/2007 | Shubert |
| 2008/0004884 A1 | 1/2008 | Flake et al. |
| 2008/0021772 A1 | 1/2008 | Aloni et al. |
| 2008/0046358 A1 | 2/2008 | Holm-Blagg et al. |
| 2008/0056541 A1 | 3/2008 | Tani et al. |
| 2008/0059302 A1 | 3/2008 | Fordyce, III et al. |
| 2008/0059303 A1 | 3/2008 | Fordyce |
| 2008/0059306 A1 | 3/2008 | Fordyce et al. |
| 2008/0059307 A1 | 3/2008 | Fordyce, III et al. |
| 2008/0065507 A1 | 3/2008 | Morrison et al. |
| 2008/0071587 A1 | 3/2008 | Granucci et al. |
| 2008/0071680 A1 | 3/2008 | Sheets |
| 2008/0077487 A1 | 3/2008 | Davis et al. |
| 2008/0077499 A1 | 3/2008 | Ariff et al. |
| 2008/0082393 A1 | 4/2008 | Ozzie et al. |
| 2008/0082397 A1 | 4/2008 | Dennison et al. |
| 2008/0082418 A1 | 4/2008 | Fordyce et al. |
| 2008/0103887 A1 | 5/2008 | Oldham et al. |
| 2008/0103888 A1 | 5/2008 | Weir |
| 2008/0103968 A1* | 5/2008 | Bies ................. G06Q 20/10 705/39 |
| 2008/0120182 A1 | 5/2008 | Arnold et al. |
| 2008/0120218 A1 | 5/2008 | Reid et al. |
| 2008/0126261 A1 | 5/2008 | Lovett |
| 2008/0133350 A1 | 6/2008 | White et al. |
| 2008/0133351 A1 | 6/2008 | White et al. |
| 2008/0134228 A1 | 6/2008 | Dion et al. |
| 2008/0147731 A1 | 6/2008 | Narayana et al. |
| 2008/0154703 A1 | 6/2008 | Flake et al. |
| 2008/0154704 A1 | 6/2008 | Flake et al. |
| 2008/0154727 A1 | 6/2008 | Carlson |
| 2008/0162258 A1 | 7/2008 | Kala et al. |
| 2008/0162269 A1 | 7/2008 | Gilbert |
| 2008/0167991 A1 | 7/2008 | Carlson et al. |
| 2008/0167992 A1 | 7/2008 | Kokernak et al. |
| 2008/0177602 A1 | 7/2008 | Sopher et al. |
| 2008/0184117 A1 | 7/2008 | Alsbury et al. |
| 2008/0195465 A1 | 8/2008 | Redmond et al. |
| 2008/0195473 A1 | 8/2008 | Laramy et al. |
| 2008/0201226 A1 | 8/2008 | Carlson et al. |
| 2008/0215436 A1 | 9/2008 | Roberts |
| 2008/0217397 A1 | 9/2008 | Degliantoni et al. |
| 2008/0221972 A1 | 9/2008 | Megdal et al. |
| 2008/0235243 A1 | 9/2008 | Lee et al. |
| 2008/0242317 A1 | 10/2008 | Abhyanker |
| 2008/0255946 A1 | 10/2008 | Altberg et al. |

(56) References Cited

U.S. PATENT DOCUMENTS

| | | |
|---|---|---|
| 2008/0275771 A1 | 11/2008 | Levine |
| 2008/0275779 A1 | 11/2008 | Lakshminarayanan |
| 2008/0281668 A1 | 11/2008 | Nurminen |
| 2008/0281699 A1 | 11/2008 | Whitehead |
| 2008/0300973 A1 | 12/2008 | DeWitt et al. |
| 2008/0301037 A1 | 12/2008 | Monk |
| 2008/0301102 A1 | 12/2008 | Liang |
| 2008/0306790 A1 | 12/2008 | Otto et al. |
| 2008/0318559 A1 | 12/2008 | Porco |
| 2008/0319843 A1 | 12/2008 | Moser et al. |
| 2008/0319847 A1 | 12/2008 | Shepard |
| 2008/0320512 A1 | 12/2008 | Knight |
| 2009/0006203 A1 | 1/2009 | Fordyce et al. |
| 2009/0006363 A1 | 1/2009 | Canny et al. |
| 2009/0018895 A1 | 1/2009 | Weinblatt et al. |
| 2009/0030793 A1 | 1/2009 | Fordyce |
| 2009/0036103 A1 | 2/2009 | Byerley et al. |
| 2009/0043593 A1 | 2/2009 | Herbrich et al. |
| 2009/0043648 A1 | 2/2009 | Mandian et al. |
| 2009/0048884 A1 | 2/2009 | Olives et al. |
| 2009/0057396 A1 | 3/2009 | Barbour et al. |
| 2009/0063351 A1 | 3/2009 | Schmeyer et al. |
| 2009/0070219 A1 | 3/2009 | DAngelo et al. |
| 2009/0070225 A1 | 3/2009 | Matz et al. |
| 2009/0076896 A1 | 3/2009 | DeWitt et al. |
| 2009/0084842 A1 | 4/2009 | Vriheas et al. |
| 2009/0112703 A1 | 4/2009 | Brown |
| 2009/0112721 A1 | 4/2009 | Hammad et al. |
| 2009/0119160 A1 | 5/2009 | Woda et al. |
| 2009/0119167 A1 | 5/2009 | Kendall et al. |
| 2009/0119170 A1 | 5/2009 | Hammad et al. |
| 2009/0125396 A1 | 5/2009 | Otto et al. |
| 2009/0132347 A1 | 5/2009 | Anderson et al. |
| 2009/0132366 A1 | 5/2009 | Lam et al. |
| 2009/0132395 A1 | 5/2009 | Lam et al. |
| 2009/0132404 A1 | 5/2009 | King et al. |
| 2009/0144122 A1 | 6/2009 | Ginsberg et al. |
| 2009/0144146 A1 | 6/2009 | Levine et al. |
| 2009/0144201 A1 | 6/2009 | Gierkink et al. |
| 2009/0144205 A1 | 6/2009 | Hurry |
| 2009/0157511 A1 | 6/2009 | Spinnell et al. |
| 2009/0157512 A1 | 6/2009 | King |
| 2009/0172551 A1 | 7/2009 | Kane et al. |
| 2009/0172728 A1 | 7/2009 | Shkedi et al. |
| 2009/0187462 A1 | 7/2009 | Gevelber et al. |
| 2009/0192882 A1 | 7/2009 | Narahashi et al. |
| 2009/0204472 A1 | 8/2009 | Einhorn |
| 2009/0216579 A1 | 8/2009 | Zen et al. |
| 2009/0216606 A1 | 8/2009 | Coffman et al. |
| 2009/0216616 A1 | 8/2009 | Wang et al. |
| 2009/0222323 A1 | 9/2009 | Kelly et al. |
| 2009/0234708 A1 | 9/2009 | Heiser et al. |
| 2009/0234711 A1 | 9/2009 | Ramer et al. |
| 2009/0234715 A1 | 9/2009 | Heiser et al. |
| 2009/0234737 A1 | 9/2009 | Sarelson et al. |
| 2009/0248496 A1 | 10/2009 | Hueter et al. |
| 2009/0248497 A1 | 10/2009 | Hueter |
| 2009/0248511 A1 | 10/2009 | Mehta et al. |
| 2009/0249384 A1 | 10/2009 | Fang et al. |
| 2009/0254414 A1 | 10/2009 | Schwarz et al. |
| 2009/0254476 A1 | 10/2009 | Sharma et al. |
| 2009/0259518 A1 | 10/2009 | Harvey et al. |
| 2009/0271305 A1 | 10/2009 | Lal et al. |
| 2009/0271327 A1 | 10/2009 | Lal et al. |
| 2009/0276317 A1 | 11/2009 | Dixon et al. |
| 2009/0299846 A1 | 12/2009 | Brueggemann et al. |
| 2009/0300490 A1 | 12/2009 | Lejano et al. |
| 2009/0327892 A1 | 12/2009 | Douillet et al. |
| 2010/0030644 A1 | 2/2010 | Dhamodharan |
| 2010/0042517 A1 | 2/2010 | Paintin et al. |
| 2010/0049620 A1 | 2/2010 | Debow |
| 2010/0057549 A1 | 3/2010 | Boal |
| 2010/0057553 A1 | 3/2010 | Ameiss et al. |
| 2010/0057586 A1 | 3/2010 | Chow |
| 2010/0094694 A1 | 4/2010 | Shapiro |
| 2010/0106568 A1 | 4/2010 | Grimes |
| 2010/0106569 A1 | 4/2010 | Grimes |
| 2010/0114677 A1 | 5/2010 | Carlson et al. |
| 2010/0114683 A1 | 5/2010 | Wessels et al. |
| 2010/0114686 A1 | 5/2010 | Carlson et al. |
| 2010/0121726 A1 | 5/2010 | Coulter et al. |
| 2010/0121727 A1 | 5/2010 | Butler |
| 2010/0121767 A1 | 5/2010 | Coulter et al. |
| 2010/0153242 A1 | 6/2010 | Preston et al. |
| 2010/0161379 A1 | 6/2010 | Bene et al. |
| 2010/0161404 A1 | 6/2010 | Taylor et al. |
| 2010/0161457 A1 | 6/2010 | Katz et al. |
| 2010/0174607 A1 | 7/2010 | Henkin et al. |
| 2010/0174623 A1 | 7/2010 | McPhie et al. |
| 2010/0191594 A1 | 7/2010 | White et al. |
| 2010/0217658 A1 | 8/2010 | Yankelevich et al. |
| 2010/0250338 A1 | 9/2010 | Banerjee et al. |
| 2010/0274625 A1 | 10/2010 | Carlson |
| 2010/0274627 A1 | 10/2010 | Carlson |
| 2010/0280880 A1 | 11/2010 | Faith et al. |
| 2010/0280881 A1 | 11/2010 | Faith et al. |
| 2010/0280882 A1 | 11/2010 | Faith et al. |
| 2010/0280927 A1 | 11/2010 | Faith et al. |
| 2010/0280950 A1 | 11/2010 | Faith et al. |
| 2010/0306029 A1 | 12/2010 | Jolley |
| 2010/0306032 A1 | 12/2010 | Jolley |
| 2011/0016103 A1 | 1/2011 | Sivakumar et al. |
| 2011/0022424 A1 | 1/2011 | VonDerheide |
| 2011/0035278 A1 | 2/2011 | Fordyce et al. |
| 2011/0035280 A1 | 2/2011 | Fordyce et al. |
| 2011/0035288 A1 | 2/2011 | Clyne |
| 2011/0047072 A1 | 2/2011 | Ciurea |
| 2011/0087519 A1 | 4/2011 | Fordyce et al. |
| 2011/0087530 A1 | 4/2011 | Fordyce et al. |
| 2011/0087531 A1 | 4/2011 | Winters et al. |
| 2011/0087546 A1 | 4/2011 | Fordyce et al. |
| 2011/0087547 A1 | 4/2011 | Amaro et al. |
| 2011/0087550 A1 | 4/2011 | Fordyce et al. |
| 2011/0093324 A1 | 4/2011 | Fordyce et al. |
| 2011/0093327 A1 | 4/2011 | Fordyce et al. |
| 2011/0093335 A1 | 4/2011 | Fordyce et al. |
| 2011/0106607 A1 | 5/2011 | Alfonso et al. |
| 2011/0106840 A1 | 5/2011 | Barrett et al. |
| 2011/0125565 A1 | 5/2011 | MacIlwaine et al. |
| 2011/0276383 A1 | 11/2011 | Heiser et al. |
| 2011/0288918 A1 | 11/2011 | Cervenka et al. |
| 2011/0295675 A1* | 12/2011 | Reodica ............. G06Q 30/02 705/14.34 |
| 2011/0302022 A1 | 12/2011 | Fordyce et al. |
| 2011/0302036 A1 | 12/2011 | Fordyce et al. |
| 2011/0302039 A1 | 12/2011 | Fordyce et al. |
| 2012/0041808 A1 | 2/2012 | Hofer et al. |
| 2012/0109709 A1 | 5/2012 | Fordyce et al. |
| 2012/0109734 A1 | 5/2012 | Fordyce et al. |
| 2012/0150601 A1 | 6/2012 | Fisher |
| 2012/0185315 A1 | 7/2012 | VonDerheide et al. |
| 2012/0191525 A1* | 7/2012 | Singh ............... G06Q 30/0233 705/14.33 |
| 2012/0215610 A1 | 8/2012 | Amaro et al. |
| 2012/0232983 A1 | 9/2012 | Bertha et al. |
| 2012/0253913 A1 | 10/2012 | Richard |
| 2012/0271697 A1 | 10/2012 | Gilman et al. |
| 2013/0103484 A1 | 4/2013 | McLaughlin |
| 2013/0151323 A1 | 6/2013 | Shepard et al. |
| 2013/0197991 A1 | 8/2013 | Basu et al. |
| 2014/0129314 A1* | 5/2014 | Kim ............... G06Q 30/0233 705/14.33 |
| 2014/0310144 A1 | 10/2014 | Bienstock et al. |

FOREIGN PATENT DOCUMENTS

| | | |
|---|---|---|
| JP | 2000357204 | 12/2000 |
| JP | 2001175761 | 6/2001 |
| JP | 2003108897 | 4/2003 |
| JP | 2006301866 | 11/2006 |
| JP | 2007102340 | 4/2007 |
| JP | 2007317209 | 12/2007 |
| KR | 1020000037128 | 7/2000 |
| KR | 20020074271 | 9/2002 |

(56) References Cited

FOREIGN PATENT DOCUMENTS

| | | |
|---|---|---|
| KR | 20030080797 | 10/2003 |
| KR | 20040040253 | 5/2004 |
| KR | 20040107715 | 12/2004 |
| KR | 1020050024746 | 3/2005 |
| KR | 1020070043329 | 4/2005 |
| KR | 20050078135 | 8/2005 |
| KR | 20050089523 | 9/2005 |
| KR | 20060034983 | 4/2006 |
| KR | 20060095895 | 9/2006 |
| KR | 20070030415 | 3/2007 |
| KR | 20070070588 | 7/2007 |
| KR | 20070075986 | 7/2007 |
| KR | 100761398 | 9/2007 |
| KR | 20070088955 | 12/2007 |
| KR | 20080104398 | 12/2008 |
| KR | 100883700 | 2/2009 |
| KR | 1020090016353 | 2/2009 |
| KR | 1020090059922 | 6/2009 |
| WO | 1999022328 | 5/1999 |
| WO | 1999050775 | 10/1999 |
| WO | 2000060435 | 10/2000 |
| WO | 2000062231 | 10/2000 |
| WO | 2001037183 | 5/2001 |
| WO | 2001039023 | 5/2001 |
| WO | 2001057758 | 8/2001 |
| WO | 2001086378 | 11/2001 |
| WO | 2001093161 | 12/2001 |
| WO | 2002005116 | 1/2002 |
| WO | 2002014985 | 2/2002 |
| WO | 2002019229 | 3/2002 |
| WO | 2002042970 | 5/2002 |
| WO | 2002071187 | 9/2002 |
| WO | 2003025695 | 3/2003 |
| WO | 2003043333 | 5/2003 |
| WO | 2003081376 | 10/2003 |
| WO | 2005001631 | 1/2005 |
| WO | 2005031513 | 4/2005 |
| WO | 2005076181 | 8/2005 |
| WO | 2006028739 | 3/2006 |
| WO | 2006126205 | 11/2006 |
| WO | 2007131258 | 11/2007 |
| WO | 2007136221 | 11/2007 |
| WO | 2008052073 | 5/2008 |
| WO | 2008055217 | 5/2008 |
| WO | 2008064343 | 5/2008 |
| WO | 2008067543 | 6/2008 |
| WO | 2008121286 | 10/2008 |
| WO | 2008144643 | 11/2008 |
| WO | 2010017247 | 2/2010 |
| WO | 2010141270 | 12/2010 |
| WO | 2011017613 | 2/2011 |

OTHER PUBLICATIONS

Bump. General FAQ's Feb. 8, 2011.
Carini, Robert, "Oracle's Complete Sell-Side E-commerce Solution," Apr. 30, 2008, 20 pages, available at http://www.oracle.com/us/products/applications/siebel/self-service-ebilling/038547.pdf.
Cashmore, Pele, "YouTube Ads: YouHate Em," available at http://mashable.com/2009/04/05/youtube-ads-youhate-em/#, Apr. 5, 2009.
CardSelect International Prepares for Launch of Customized Loyalty Platform for Credit Cards. Business Editors. Business Wire [New York] Apr. 5, 2001: 1.
Georgiadis, Margo et al., "Smart data, smart decisions, smart profits: the retailer's advantage," 22 pages, Feb. 8, 2005. Available at http://web.archive.org/web/20050208141921/http://www.mckinsey.com/practices/relail/knowledge/articles/smartdalasmartdecisions.pdf.
Google ad words Tracking Codes—Measuring Your Profits, AdWords Help. Google Corporation—Book Excerpt,pp. 1-2. Retrieved from the Internet by Third Party Jun. 20, 2011: <URL: href=http://adwords.google.com/supportlawlbin/answer.py?hl=en&answer=146309.
International Patent Application PCT/US2011/037769, International Search Report and Written Opinion, dated Jan. 9, 2012.
International Patent Application PCT/US12/22417, International Search Report and Written Opinion, dated Aug. 9, 2012.
International Patent Application PCT/US2009/052766, International Search Report and Written Opinion, dated Mar. 11, 2010.
International Patent Application PCT/US2010/036076, International Search Report & Written Opinion, dated Dec. 30, 2010.
International Patent Application PCT/US2010/043440, International Search Report and Written Opinion, dated Feb. 24, 2011.
International Patent Application PCT/US2010/044449, International Search Report and Written Opinion, dated Mar. 14, 2011.
International Patent Application PCT/US2010/044459, International Search Report and Written Opinion, dated Mar. 28, 2011.
International Patent Application PCT/US2010/044706, International Search Report and Written Opinion, dated Mar. 25, 2011.
International Patent Application PCT/US2010/044779, International Search Report and Written Opinion, dated Mar. 31, 2011.
International Patent Application PCT/US2010/044786, International Seach Report and Written Opinion, dated Mar. 17, 2011.
International Patent Application PCT/US2010/045082, International Search Report and Written Opinion, dated Feb. 28, 2011.
International Patent Application PCT/US2010/050504, International Seach Report and Written Opinion, dated Apr. 21, 2011.
International Patent Application PCT/US2010/050923, International Seach Report and Written Opinion, dated Apr. 26, 2011.
International Patent Application PCT/US2010/051262, International Seach Report and Written Opinion, dated May 30, 2011.
International Patent Application PCT/US2010/051490, International Seach Report and Written Opinion, dated Apr. 21, 2011.
International Patent Application PCT/US2010/051853, International Seach Report and Written Opinion, dated Jun. 21, 2011.
International Patent Application PCT/US2010/052070, International Search Report and Written Opinion, dated May 31, 2011.
International Patent Application PCT/US2010/053061, International Search Report and Written Opinion, dated May 30, 2011.
International Patent Application PCT/US2012/031171, International Search Report and Written Opinion, dated Oct. 12, 2012.
Li, Wen-Syan, "Knowledge Gathering and Matching in Heterogeneous Databases," Working Notes of the AAAI Spring Symposium on Information Gathering, pp. 116-1216, Mar. 27, 1995.
Loyalty Solutions—Issuing Rewards Services 2008, First Data Corporation. Available at http://www.firstdata.com/downloads/marketing-fs/fd_issuingrewards_ss.pdf.
Mielikainen, Taneli, "Privacy Problems with Anonymized Transaction Databases," 7th International Conference on Discovery Science, pp. 219-229, Oct. 2, 2004.
Now You Can Bump iPhones to Connect on Facebook, Twitter and Linkedln Mashable, Feb. 8, 2011.
Operating Rules Women, Infants and Children (WIC) Electronic Benefits Transfer (EBT), Dec. 21, 2010.
Operating Rules Women, Infants and Children (WIC) Electronic Benefits Transfer (EBT), Dec. 21, 2010 Marketing Research, vol. 20, pp. 134-148, May 1983.
PayPal on Android Lets You Bump Phones to Send Money, by Sarah Perez, Aug. 6, 2010.
Scotiabank Announces Its First All-in-One Card: Integrating Smart Chip Technologies' Loyalty with Credit, Debit, and Micropayments on a Single Smart Card/ PR Newswire [New York]Jul. 31, 2001: 1.
Shermach, Kelly. Coalition Loyalty Programs: Finding Strength in Numbers. Card Marketing 53 (Apr. 2001 ): 1, 12+.
Van Grove, Jennifer, "Are Your Online Video Ads Driving Actual Offline Purchases?", available at http://mashable.com/2009/05/18/video-impact/#, May 18, 2009.

\* cited by examiner

SYSTEMS AND METHODS OF USING A COMMUNICATION NETWORK TO COORDINATE PROCESSING AMONG A PLURALITY OF SEPARATE COMPUTING SYSTEMS

RELATED APPLICATIONS

The present application is a continuation of U.S. patent application Ser. No. 14/803,972, filed Jul. 20, 2015, which the benefit of U.S. Provisional Patent Application No. 62/028,038, filed Jul. 23, 2014, the disclosures of all of which are hereby incorporated herein by reference in their entireties.

The present application relates to U.S. patent application Ser. No. 14/738,239, filed Jun. 12, 2015 and entitled "Communication Systems and Methods to Transmit Data Among a Plurality of Computing Systems in Processing Benefit Redemption", U.S. Pat. App. Pub. No. 2012/0191525 entitled "Systems and Methods to Facilitate Loyalty Reward Transactions," U.S. Pat. App. Pub. No. 2011/0087530 entitled "Systems and Methods to Provide Loyalty Programs," U.S. Pat. App. Pub. No. 2010/0211445 entitled "Incentives Associated with Linked Financial Accounts," and U.S. Pat. App. Pub. No. 2009/0271262 entitled "Authorization System with Split Messaging," the entire disclosures of which applications are hereby incorporated herein by reference.

FIELD OF THE TECHNOLOGY

At least some embodiments disclosed in the present application relate to coordination of a plurality of separate computer systems having separate resources to process a task in general and more particularly but not limited to the use of a communication system to set up the processing of a computing task using a computing system that lacks a required resource hosted on a separate computer system.

BACKGROUND

In a system having multiple computer systems connected via one or more computer networks, different portions of computing resources for processing a task may reside in different computer systems. The use of a predetermined communication protocol allows the computer systems to communicate with each other in a predetermined way to utilize the resources that are distributed among the computer systems for the processing of the task. Improvements to the communication protocol can improve the performance of the system as a whole and/or improve the functionalities of the system as a whole. In some instances, improvements to the communication protocol can improve the performance of some of the individual computer systems and/or improve the functionalities of the individual computer systems.

For example, a typical electronic payment processing network has a transaction handler interconnecting a plurality of acquirer processors and a plurality of issuer processors according to an electronic communication standard. The electronic payment processing network has the capability to process certain transactions, such as credit card or debit card transactions, but may not have the capability to process other transactions, such as reward point transactions. The reward points may be hosted in computer systems separate from the electronic payment processing system.

U.S. Pat. App. Pub. No. 2011/0087530 discloses a data structure for a communication protocol in an electronic payment processing system, in which the data field for the message type identifier in a transaction message is extended to accommodate an identifier for crediting reward and an identifier for redeeming reward. As a result, the communication protocol is extended to process not only payment transactions in financial currencies, but also the crediting and redeeming of reward benefits.

In general, a typical electronic payment processing system includes separate computing systems such as a transaction handler, one or more issuer processors, one or more acquirer processors, and transaction terminals. The individual computing systems in the electronic payment processing system are generally connected via one or more computer networks. Resources for processing a payment from a consumer to a merchant are typically distributed among the computing systems connected via computer networks.

A typical transaction terminal of a merchant is configured with the resources to obtain consumer account identification information of a consumer to initiate a transaction message and communicate the transaction message to an acquirer processor for processing; a typical merchant account is controlled by an acquirer processor; a typical consumer account is controlled by an issuer processor; the transaction handler of the electronic payment processing system interconnects the acquirer processors and the issuer processors and has the resources to route messages from acquirer processors to responsible issuers processors based on consumer account identification information and route messages from issuer processors to responsible acquirer processors based on identification information of merchant accounts.

However, extending the communication protocol of an electronic payment processing network may involve undesirable impacts to certain computing apparatuses within the electronic payment processing network and thus may have difficulties in its implementations.

The entire disclosures of the above discussed patent documents are hereby incorporated herein by reference.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
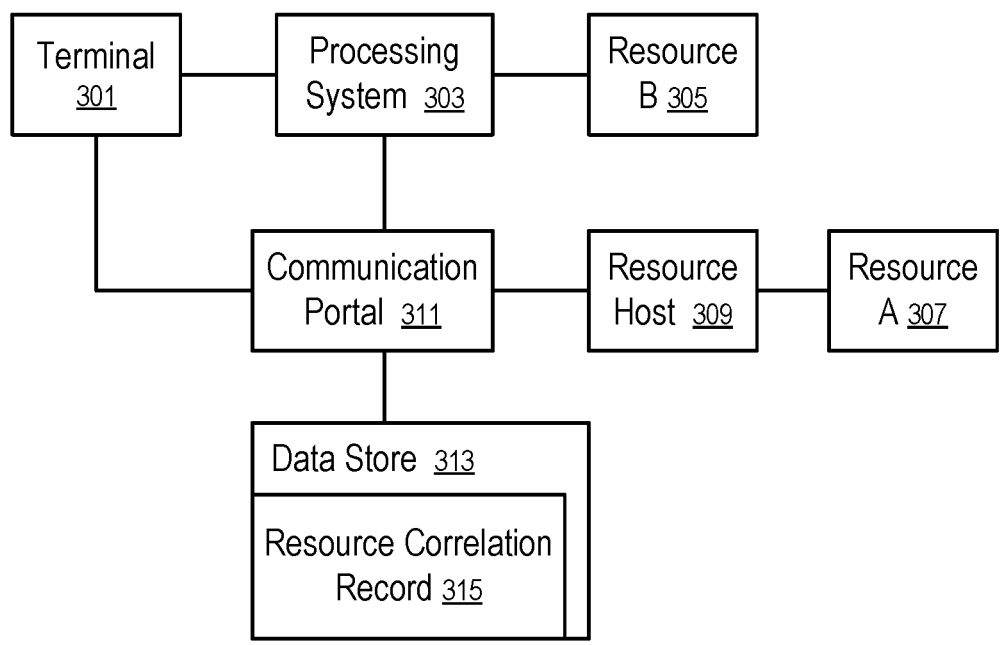
FIG. 1 shows a system configured to use a communication network to coordinate processing among a plurality of separate computing systems according to one embodiment.

FIG. 1 shows a system configured to use a communication network to coordinate processing among a plurality of separate computing systems according to one embodiment.

In FIG. 1, a terminal (301) is configured to process a predetermined type of operations with the processing system (303) using a resource B (305) configured with the processing system (303). The terminal (301) is configured to communicate with the processing system (303) according to a predetermined communication protocol to process the operations in connection with the resource B (305).

In FIG. 1, the processing system (303) is expanded to allow the processing of operations upon a separate resource A (307) that is hosted on a resource host (309) that is not directly addressable via the predetermined communication protocol between the terminal (301) and the processing system (303).

In FIG. 1, the processing system (303) is expanded via the use of a communication portal (311) which has communication links with the terminal (301), the processing system (303), and the resource host (309).

In FIG. 1, the communication portal (311) is configured with a data store (313) to store resource correlation records (e.g., 315) to facilitate the operations on the resource A (307), when the terminal (301) communicates with the processing system (303) using the predetermined communication protocol that may not directly support the operations on the resource A (307).

In one embodiment, to enable the terminal (301) communicating with the processing system (303) using the predetermined communication protocol designed for operations on resource B (305) to operate upon resource A (307), while using certain functions of the processing system (303) in processing the operations, the terminal (301) uses the communication link between the terminal (301) and the communication portal (311) to establish a correlation between the resource A (307) and the resource B (305).

For example, the terminal (301) uses the communication link between the terminal (301) and the communication portal (311) to indicate to the communication portal (311) the intent to operate on the resource A (307). In response, the communication portal (311) stores a resource correlation record (315) associating the resource A (307) identified by the terminal (301) and the resource B (305) that is allocated for the subsequent processing of the resource A (307) via the processing system (303). Operations on the resource B (305) by the processing system (303) allows the terminal (301) to utilize the existing functions of the processing system (303) needed in operating on the resource A (307); and the communication portal (311) further communicates with the resource host (309) to complete other tasks required to operate on the resource A (307).

For example, as a response to the communication from the terminal (301) indicating the intent to operate on resource A (307), the communication portal (311) identifies the resource B (305) to the terminal (301). Subsequently, the terminal (301) may use the predetermined communication protocol with the processing system (303) to operate on the resource B (305).

In FIG. 1, the communication portal (311) uses the communication link between the processing system (303) and the communication portal (311) to monitor operations on resource B (305). Upon detection of an operation on the resource B (305), the communication portal (311) communicates with the resource host (309) and the processing system (303) to perform additional operations to supplemental the operations upon the resource B (305) with additional operations on the resource A (307) hosted on the resource host (309), in accordance with the resource correlation record (315).

Thus, through the use of the communication portal (311) and the resource correlation record (315), the system as illustrated in FIG. 1 allows the terminal (301) to perform operations on resource A (307) using a predetermined communication protocol between the terminal (301) and the processing system (303) designed for resource B (305).

The technology illustrated in FIG. 1 can be used, for example, to process reward point/benefit transactions using an electronic payment processing network configured to process financial currency transactions. For example, a system and method can be configured using the technique to process reward redemption using an electronic payment processing network without changing the communication protocol used for payment processing within the electronic payment processing network.

Figure 2:
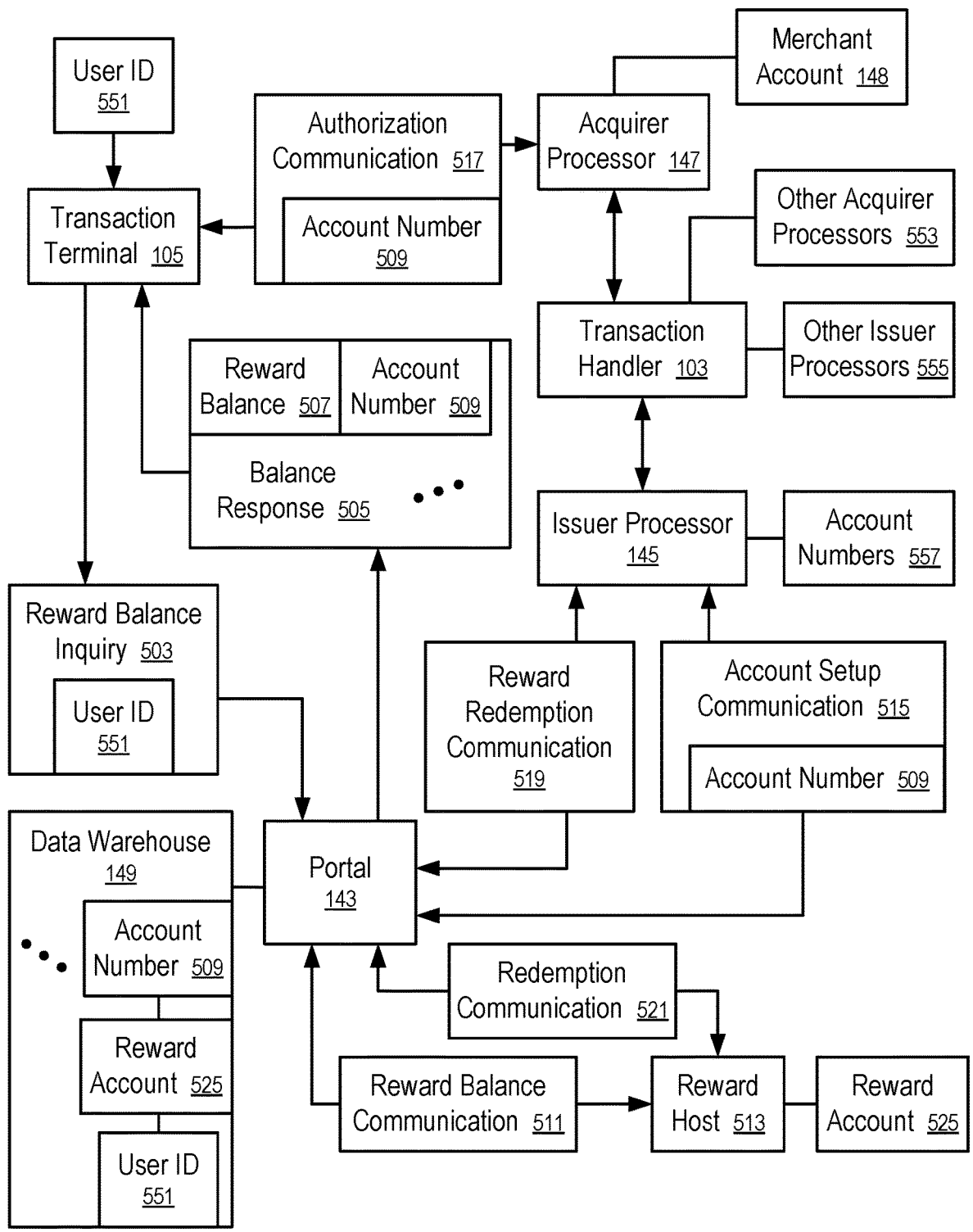
FIG. 2 shows a communication system to process reward redemption according to one embodiment.

FIG. 2 shows a communication system to process reward redemption according to one embodiment. In FIG. 2, the communication system includes a plurality of separate computing systems connected via one or more computer networks.

Figure 8:
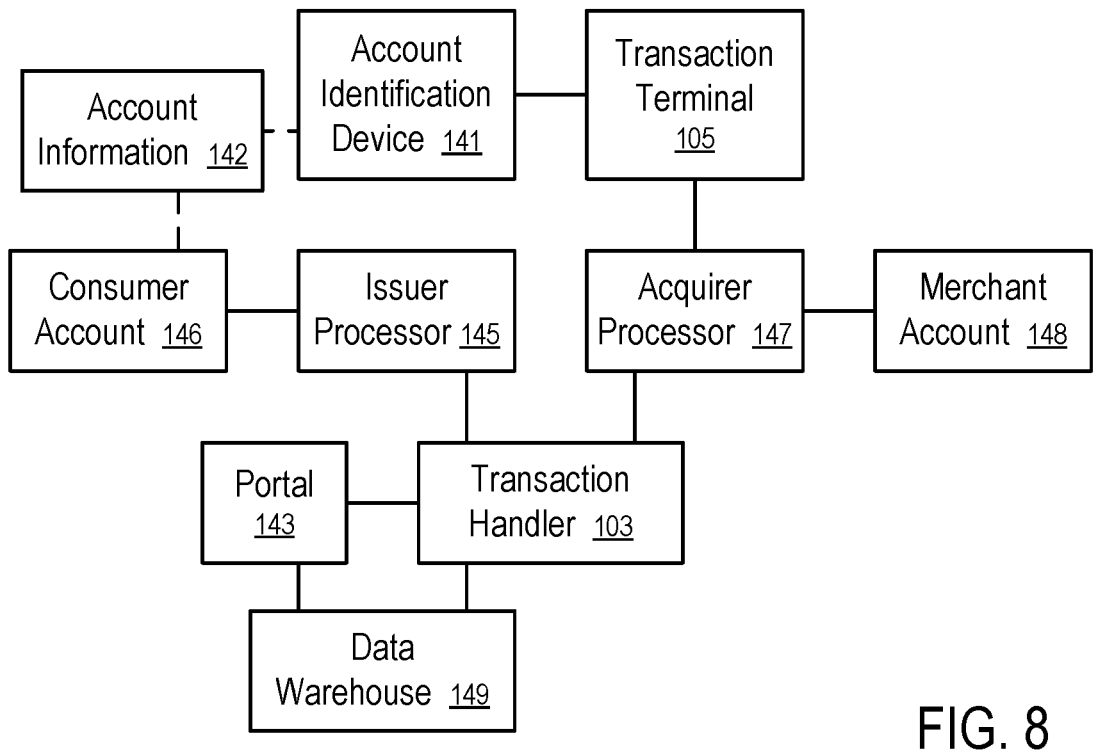
FIG. 8 shows a system to provide information based on transaction data according to one embodiment.

For example, the computing systems in FIG. 2 include a transaction terminal (105) disposed in a store of a merchant, an acquirer processor (147) in control of a merchant account (148), other acquirer processors (553) controlling other merchant accounts, an issuer processor (145) controlling account numbers (557), other issuer processors (555), such as issuer processor (145) controlling a consumer account illustrated in FIG. 8. The issuer processor (145) controlling the account numbers (557) for reward redemption in FIG. 2 may or may not be the same as the issuer processor (145) controlling the consumer account (146). The account information (142) of the consumer account (146) of the user of the reward account (525) is used as the user ID (551) in one embodiment; and in other embodiments, other types of user IDs, such as a member ID, a phone number, an email address, etc., can be used to identify the reward account (525) via a registration process.

The computing system in FIG. 2 further includes a portal (143) in control of the reward account (525) of the user and a reward host (513) configured to facilitate the reward balance inquiry (503), account setup communications (515), and redemption communications (519), as further discussed below.

In FIG. 2, the different computing systems have different resources for the processing of reward redemptions. For example, the reward host (513) is in control of the reward account (525) of the user. The issuer processor (145) is in control of accounts represented by the account numbers (557). The transaction handler (103) is configured with routing information to route messages among the issuer processors (145, 555) and the acquirer processors (147, 553). The acquirer processors (147, 553) are in control of the merchant accounts (e.g., 148) to receive payments initiated on the transaction terminals (e.g., 105).

FIG. 2 illustrates an example using one transaction terminal (105). In a typical implementation, multiple transaction terminals (105) can be similarly connected to the portal (143) and respective acquirer processors (147, 553).

FIG. 2 illustrates an example using one reward host (513). In a typical implementation, the portal (143) can support multiple reward hosts (513) in a similar way.

In FIG. 2, a communication protocol is configured to allow the use of the electronic payment processing network, including the acquirer processor (147), the transaction handler (145), and the issuer processor (145) to process the redemption of rewards using existing communication messages standards for the electronic payment processing network.

To facilitate the reward redemption, the portal (143) is provided to communicate with the transaction terminal (105), the reward host (513) and the issuer processor (145) to set up accounts for payment processing during balance inquiry and to process reward redemption during authorization of payments made using the account numbers (557), as further discussed below.

In one embodiment, the portal (143) of FIG. 2 is configured to present a user interface that allows a user to provide data to associate user ID (551) with the identification of the reward account (525) in a registration process.

After the registration data associating the user ID (551) with the identification of the reward account (525) is stored in the data warehouse (149) of the portal (143), the portal (143) may process the reward redemption operations in response to the user ID (551).

For example, when the transaction terminal (105) receives the user ID (551) from a user to process a purchase, the transaction terminal (105) transmits to the portal (143) a reward balance inquiry (503) that identifies the user ID (551).

Based on the registration data associating the user ID (551) with the identification of the reward account (525), the portal (143) of FIG. 2 performs a reward balance communication (511) with the reward host (513) to obtain the current balance of the reward account (525).

Further, the portal (143) performs an account setup communication (515) with a predetermined issuer processor (145) to obtain an account number (509), selected from a plurality of account numbers (557) controlled by the issuer processor (145), for the reward transaction that is predicted to follow the reward balance inquiry (503).

As a response to the reward balance inquiry (503), the portal (143) stores data associating the account number (509) with the reward account (525) identified by the user ID (551) and transmits the balance response (505) to the transaction terminal (105). The balance response (505) illustrated in FIG. 2 identifies not only the reward balance (507) for the reward account (525) identified via the user ID (551) but also the account number (509) that is obtained via the account setup communication (515) and that can be used to initiate a payment transaction that corresponds to the redemption of rewards from the reward balance (507).

For example, after obtaining the balance response (505), the transaction terminal (105) may present the reward balance (507) to the user of the user ID (551) and present a user interface that allows the user to request the redemption of a portion of the reward balance (507), or the reward balance (507) in its entirety.

Upon receiving the user instructions to redeem rewards consistent with the reward balance (507), the transaction terminal (105) performs an authorization communication (517) with the acquirer processor (147) using the account number (509). The authorization communication (517) includes an authorization request transmitted to the acquirer processor (147) for propagation, via the transaction handler (103), to the issuer processor (145) identified by the account number (509), and an authorization response propagated back from the issuer processor (145), via the transaction handler (103) and acquirer processor (147), to the transaction terminal (105).

In one embodiment, the authorization communication (517) is in compliance with existing communication standard for payment transactions in the electronic payment processing network, such as a payment transaction made in consumer account (146)

In FIG. 2, in response to the authorization request identifying the account number (509), the issuer processor (145) performs a reward redemption communication (519) with the portal (143), which in turn performs a redemption communication (521) with the reward host (513).

In FIG. 2, the reward redemption communication (519) includes a communication from the issuer processor (145) to the portal (143) to request reward redemption for the account number (509). In response, the portal (143) identifies the reward account (525) based on the data associating the account number (509) with the reward account (525), previously established via the account setup communication (515). The portal (143) uses the redemption communication (521) to request redemption of rewards from the reward account (525) in accordance with the transaction amount specified in the authorization request received in the issuer processor (145). The redemption communication (521) includes a message transmitted from the reward host (513) to the portal (143), indicating whether the redemption is successful or not.

For example, the reward redemption operations may include the rewards host (513) reserving the portion of the redeemed rewards for subsequent settlement. For example, the reward redemption operations may include the rewards host (513) removing the redeemed rewards from the reward account (525) to hold the redeemed rewards for pending settlement.

The result of the redemption operations is propagated from the reward host (513) to the issuer processor (145) via the portal (143) using the redemption communication (521) and the reward redemption communication (519). Based on the result, the issuer processor (145) generates the authorization response for the payment transaction requested using the account number (509), approving or rejecting the payment transaction.

During settlement of the payment transaction, the issue processor (145) provides the funds according to the payment transaction to the merchant account (148) controlled by the acquirer processor (147); and the reward host (513) provides funds corresponding to aggregated redeemed rewards to the issuer processor (145).

Thus, the system of FIG. 2 includes a just-in-time account setup established via the account setup communication (515) responsive to the reward balance inquiry (503). The just-in-time account setup assigns a virtual account, a debit account, or a prepaid account for a subsequent reward redemption implemented using a payment transaction in the assigned account. The assigned account may be limited to one-time use and/or limited to be used within a predetermined period of time after the setup. A payment transaction made in the assigned account can be processed within an electronic payment processing network in a standardized way like a payment transaction made in a typical consumer account (146). However, the processing of the payment transaction in the assigned account at the issuer processor is enhanced and/or facilitated via the redemption communications (519 and 521) established via the portal (143). Using the redemption communications (519 and 521) the reward redemption from the reward account (525) can be processed just-in-time to support the payment transaction processed in the issuer processor (145) for the payment made using the assigned account.

For example, a reward redemption platform of one embodiment (e.g., implemented via the portal (143)) is configured to associate a virtual account under control of an issuer processor with a reward account (525) during the balance inquiry (551) of the reward account (525). The account number (509) of the virtual account is provided with the balance (507) of the reward account (525) to the transaction terminal (105), which allows a user to specify a redemption amount that does not exceed the reward balance (505). The transaction terminal (105) than uses the account number (509) provided within the balance result (505) responsive to the balance inquiry (503) to initiate a payment transaction in the virtual account. The issuer processor (145) is configured to communicate with the reward redemption platform (e.g., implemented via the portal (143)) to convert the redeemed rewards to funds for a payment provided by the issuer processor (145) to the acquirer processor (147) of the merchant account (148) via an electronic payment processing network. Thus, the reward transactions can be performed using the electronic payment processing network with minimum impact on the electronic payment processing network.

Thus, the reward redemption platform (e.g., implemented via the portal (143)) allows the redemption of reward benefits (e.g., loyalty rewards, such as loyalty points, miles, virtual currency) to be performed using the payment processing network configured to processing payments in consumer accounts (e.g., 146), without requiring a transaction be made in the consumer payment account using a currency issued by a government.

In one embodiment, virtual accounts or one-time use prepaid accounts are used to manage benefits in the reward accounts such that the reward redemption can be performed as payment transactions in the virtual accounts or one-time use prepaid accounts using the payment processing network.

For example, a reward redemption platform is configured to communicate with an issuer processor to assign a one-time use account for the redemption of reward benefits of a user. The assignment of the virtual account can be performed in response to a balance inquiry in the preparation for reward redemption. For example, in response to a balance inquiry from a merchant's computing system, the one-time use account is assigned and the account number is communicated to the transaction terminal to initiate a payment that is actually funded by the reward benefits. The transaction messages from the transaction terminal, to the issuer processor via the respective acquirer processor and the transaction handler are processed in a way as the processing of messages for a payment transaction in a consumer account (e.g., a credit account, a debit account, a prepaid account, etc.). At the backend, the issuer processor requests helps from the portal in redeeming rewards to support the payment transaction, The account assigned for benefit redemption may be a one-time account, a virtual account, a prepaid account, a debit account and/or a private label account. For example, the virtual account can be assigned for the redemption of the reward benefits of the user within a predetermined period of time; and after the period of time, the virtual account is no longer valid. In the embodiment, the account is established and/or assigned solely for the redemption of reward benefits; and the account is funded solely by the reward benefits in one or more of the reward accounts of the user.

In one embodiment, the account information of the virtual account is transmitted to a merchant (or the user) in a response to a reward balance inquiry. The balance information allows the user to request the redemption of a valid amount of rewards from the reward account of the user and thus reduces the chance of rejection due to the request of a redemption amount exceeding the balance of the reward account. The account information allows the transaction terminal of the merchant to initiate a payment transaction in the virtual account in the payment processing network without modifications to the transaction terminal of the merchant, and without modifications to the acquirer processor of the merchant. In one embodiment, the payment transaction in the virtual account is performed substantially in the same way as a payment transaction in the consumer account of the user; and arrangements to enable the benefit redemption are discussed below.

In one embodiment, when the transaction request in the virtual account is received in the issuer processor of the virtual account, the issuer processor is configured to communicate with the reward redemption platform for benefit processing in accordance with the information stored to set up the virtual account and/or to assign the virtual account for the redemption of the reward benefits of the user. In response, the reward redemption platform is configured communicate with the host of the reward benefits to reserve, convert, and/or deduct the reward benefits of the user for payment to the merchant.

For example, during the authorization phase of the transaction in the virtual account, the transaction amount for the redemption is specified via an authorization request and in accordance with the reward balance reported by the host of the reward benefits. During the authorization of the transaction in the issuer processor, the issuer processor requests the reward redemption platform to authorize the transaction; and the reward redemption platform communicates with the host of reward benefits to reserve the amount of benefits to be redeemed and provide authorization. During the settlement of the transaction, the issuer processor communicates with the host of reward benefits via the reward redemption platform to deduct the redeemed benefits from the reward account of the user and transmit a payment corresponding to the redeemed benefits to the acquirer processor of the merchant.

In one embodiment, during the balance inquiry, the reward redemption platform and/or the reward host converts the balance to an equivalent account balance of the virtual account in a payment currency issued by a government (e.g., U.S. dollar). Thus, the transaction terminal of the merchant may initiate the payment transaction in the payment currency.

Alternatively, the virtual account may be configured to use a virtual currency corresponding to the reward currency provided by the reward host; and the reward currency is converted to a payment currency issued by a government (e.g., U.S. dollar) during the settlement of the reward redemption transaction; and the transaction initiated on the transaction terminal is specified in the virtual currency.

In one embodiment, when the authorization request is made in the reward currency (e.g., points, miles, virtual currency), the authorization response is configured to specify the transaction amount in a payment currency issued by a government (e.g., U.S. dollar). The monetary value of the redeemed reward benefits is communicated to the transaction terminal of the merchant via the authorization response. The settlement of transaction is based on the monetary value of the redeemed reward benefits specified in the authorization response. Since the conversion from the redeemed reward amount to a monetary value is postponed until the authorization is approved, the last conversion rate between the reward currency and the payment currency can be applied to the conversion during the authorization of the reward redemption. During the authorization, the redeemed rewards are converted to an amount of payment currency and reserved for settlement.

In one embodiment, the authorization request for the reward redemption transaction and the settlement request for the reward redemption transaction are communicated via two passes of request/response communications. In another embodiment, the authorization and settlement requests of the reward redemption transaction are combined in the same messages for one pass of request/response communications, communicated between the transaction terminal of the merchant and the issuer processor of the virtual account.

As a result of the system, the reward redemption transaction can be performed as a transaction in the virtual payment account in a way similar to a transaction in a typical consumer payment account. The virtual payment account can be set up prior to the transaction (e.g., during the reward balance inquiry, or in response to a user request); and the issuer processor is configured to communicate with the reward host, preferably via a centralized reward redemption platform, to authorize and/or settlement the requested redemption of rewards.

In one embodiment, after a merchant submits a request to get the balance of a reward account of a user to a reward redemption platform, the platform forwards the balance request to a rewards bank, which obtains the balance information and provides the balance information to the reward redemption platform. If the balance is greater than zero, the reward redemption platform submits a request for a private label payment account number to an issuer processor, which in response allocates a private label payment account for the request and communicates the account information of the allocated private label payment account to the reward redemption platform. The reward redemption platform associates the reward account of the user with the allocated private label payment account. After providing the account information and the balance information to the merchant as a response to the balance request, the merchant may use the account information to initiate a payment transaction in the payment processing network in which the issuer processor is connected. When the issuer processor receives the transaction request in the allocated private label payment account, the issuer processor communicates with the rewards bank, via the reward redemption platform, to order the conversion of rewards to a payment to the merchant. The payment is provided to the merchant from the issuer processor to the acquirer processor of the merchant in a way same as a payment is provided from a consumer payment account.

In one embodiment, a user may visit the portal of the reward redemption platform to look up the reward balance in the reward account of the user and/or request the private label payment account for the redemption of rewards from the reward accounts. In one embodiment, the private label payment account may be linked to multiple reward accounts; and the user may specify rules for the redemption of rewards from the multiple reward accounts. In one embodiment, an account identification device is provided to the user to present the account information of the private label payment account. The user may use the private label payment account in a way similar to the use of a consumer payment account issued to the user.

Figure 3:
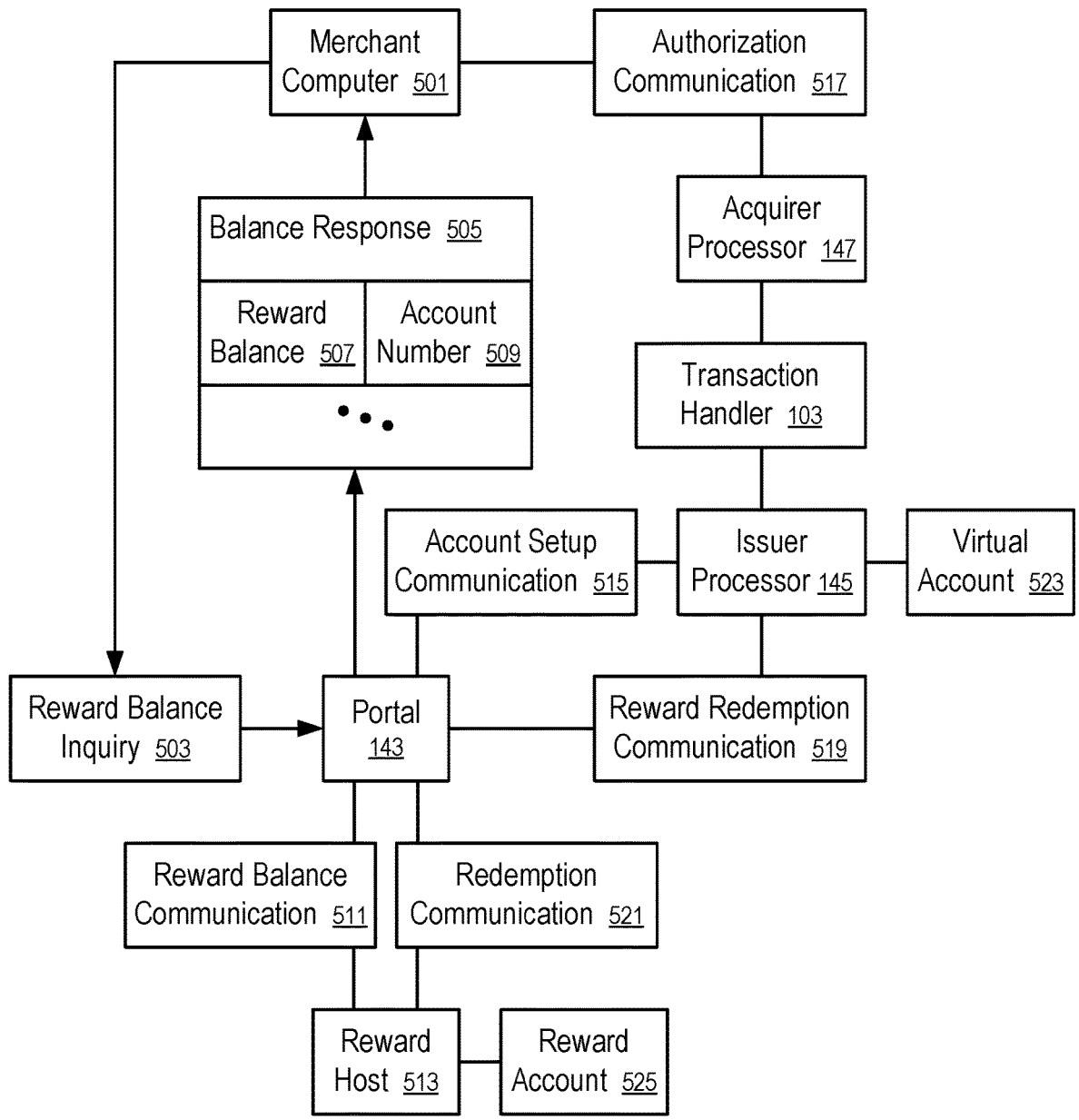
FIG. 3 shows a system to process reward redemption according to one embodiment.

FIG. 3 shows a system to process reward redemption according to one embodiment. In FIG. 3, a portal (143) is configured to communicate with the merchant computer (501), the issuer processor (145) of virtual accounts (or private label accounts) configured for reward redemptions, and one or more reward hosts (e.g., 513).

In one embodiment, the issuer processor (145) of the virtual accounts (or private label accounts) is implemented as a part of the transaction handler (103) which interconnects acquirer processors (e.g., 147) and issuer processors on the payment processing network (e.g., illustrated in FIG. 8).

In FIG. 3, the issuer processor (145) is configured to allocate/generate a virtual account (523) (or private label account) in response to a request from the portal (143).

For example, when the merchant computer (501) sends a reward balance inquiry (503) to the portal (143), the portal (143) requests, via the account setup communication (515), a virtual account (523) for the reward account (525) identified in the reward balance inquiry (503), if it does not already have an associated virtual account (523). In one embodiment, the portal (143) is coupled with the data warehouse (149) to store data associating the reward account (525) and the virtual account (523).

In FIG. 3, the portal (143) and the reward host (513) are configured to exchange reward balance communication (511) for reward accounts administered on the reward host (513). In one embodiment, the virtual account (523) is requested if the balance of the respective reward account (525) is above zero; and when the reward balance is zero, the virtual account (523) is not requested.

In FIG. 3, in response to the reward balance inquiry (503), the portal (143) provides the balance response (505) that includes the reward balance (507) of the reward account (525) identified in the reward balance inquiry (503), and the account number (509) of the virtual account assigned, via the account setup communication (515), to the reward account (525) identified in the reward balance inquiry (503). The reward balance (507) may be specified in terms of a payment currency issued by a government (e.g., U.S. dollar), or the reward currency identified by the reward host (513).

The merchant computer (501) may present the reward balance (507) and be configured to allow the user to request the redemption of a reward amount that does not exceed the reward balance (507). In one embodiment, the merchant computer (501) includes a transaction terminal (105) connected to the acquirer processor (147) of the merchant.

Using the account number (509), the transaction terminal (105) of the merchant can initiate an authorization communication (517) in the virtual account (523) associated with the reward account (525).

In FIG. 3, the authorization communication (517) includes an authorization request transmitted from the merchant computer (501) to the issuer processor (145) via the acquirer processor (147) and the transaction handler (103), and an authorization response transmitted from the issuer processor (145) to the merchant computer (501) via the transaction handler (103) and the acquirer processor (147).

In FIG. 3, in response to the authorization request in the virtual account (523), the issuer processor (145) and portal (143) exchange reward redemption communication (519); and the portal (143) and the reward host (513) exchange the redemption communication (521).

In one embodiment, the portal (143) is configured to route the redemption request corresponding to the authorization request to the reward host (513) based on the association between the reward account (525) and virtual account (523) established via the account setup communication (515). In response to the redemption request, the reward host (513) is configured to reserve, deduct, and/or convert the redeemed rewards from the reward account (525). The portal (143) is configured to propagate the rejection or acceptance of the redemption request, from the reward host (513) to the issuer processor (145) via the reward redemption communication (519) and the redemption communication (521).

Thus, with the pre-redemption arrangement to set up the virtual account (523) for association with the reward account (525) prior to the reward redemption, and the redemption processing arrangement among the issuer processor (145), the portal (143) and the reward host (513), the redemption transaction can be performed via the payment processing network, without modifications to the acquirer processor (147), and the transaction handler (103).

Figure 4:
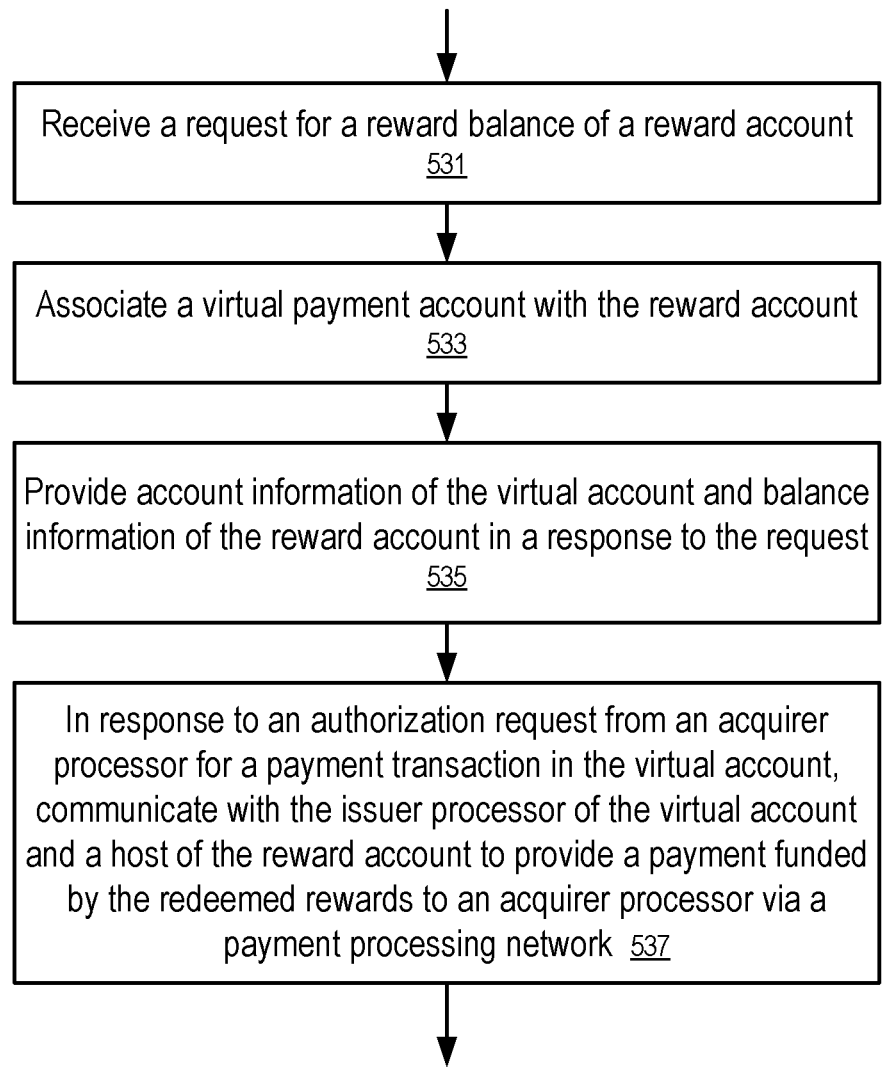
FIG. 4 shows a method to process reward redemption according to one embodiment.

FIG. 4 shows a method to process reward redemption according to one embodiment. For example, the method of FIG. 4 can be implemented in a system illustrated in FIG. 2 or 3.

In FIG. 4, a computer apparatus is configured to: receive (531) a request for a reward balance of a reward account; associate (533) a virtual payment account with the reward account; provide (535) account information of the virtual account and balance information of the reward account in a response to the request; and in response to an authorization request from an acquirer processor for a payment transaction in the virtual account, communicate (537) with the issuer processor of the virtual account and a host of the reward account to provide a payment funded by the redeemed rewards to an acquirer processor via a payment processing network.

In one embodiment, issuer designated accounts are used to manage the processing of reward redemption.

In one embodiment, an issuer designated account is issued to represent a reward account, or a reward host, as a funding source for payment transactions.

For example, the designated account may be issued as a payment account specifically for a reward account of a particular user, such that the redemption of the rewards from the reward account of the particular user can be accessed via a payment transaction in the designated account. In such an example, a transaction in the payment account is only for the redemption of rewards from the reward account of the particular user, not from different reward accounts of other users.

For example, the designated account may be issued as a payment account for a set of reward accounts having the same reward currency hosted on the same reward host, such that the redemption of the rewards from any reward account in the set of reward accounts can be accessed via a payment transaction in the designated account. In such an example, a transaction in the payment account may be for the redemption of rewards from any of the set of reward accounts. The issuer may settle multiple payment transactions made in the payment account together with the reward host, by receiving from the reward host the total amount of funds used to pay merchants in the multiple payment transactions. Thus, the settlement with the reward host for the multiple payment transactions in the payment account can be combined, even when the reward currencies are redeemed from different reward accounts.

In one embodiment, a reward redemption platform is configured to pre-associate one or more reward accounts with an issuer designated account. During balance inquiry, the reward redemption platform provides the merchant with the reward account balance, together with the associated issuer designated account. The response to the balance inquiry may also include the exchange rate between the currency for transactions in the issuer designated payment account and the rewards (e.g., loyalty points, virtual currency, miles provided in a loyalty program). Thus, the user may specify an amount of rewards to be redeemed, and the merchant system can convert the redeemed amount into a transaction amount of a payment transaction in the issuer designated payment account.

To redeem an amount of rewards as payment to the merchant, the merchant initiates a transaction in the issuer designated account and initiates a separate redemption request with the reward redemption platform. The merchant system is configured to approve the redemption of the rewards as payment after both the merchant and the reward redemption platform authorize the respective requests.

The issuer processor may approve the payment transaction in the issuer designated account without considering the current reward balance of the reward account of the user; and the reward redemption platform is to communicate with the reward host to ensure that the redeemed amount is within the balance limit and to remove the redeemed rewards from the reward balance of the respective reward account.

During the process of the redemption request from the merchant system, the deduction of the redeemed rewards is performed in real time with the authorization of the payment transaction in the issuer designated account such that the same set of rewards cannot be redeemed more than once.

In the payment transactions made in the issuer designated account, the issuer processor pays the respective acquirers (and thus the respective merchants) the transaction amounts the payment transactions; and the issuer, the rewards redemption platform, and the reward host exchange reconciliation files to settle the funds for the rewards redeemed via the set of payment transactions.

For example, the settlement of the funds paid out as redeemed rewards can be performed periodically, daily, weekly, or monthly, or when a predetermined criterion is met, such as when the total amount of the funds that have been paid out reaches a threshold. In some embodiments, the reward host may prepaid the issuer at least a portion of the funds for the redemption of the rewards; and the issuer may or may not provide a credit line for making payments corresponding to the redeemed wards.

Thus, the reward redemption platform and the issuer processor does not have to communicate in real time during the processing of a payment transaction in the issuer designated payment account for the redemption of rewards from rewards hosted on a reward host that is different from the issuer processor.

In one embodiment, after a merchant submits a request to get the balance of a reward account of a user to a reward redemption platform, the platform forwards the balance request to a rewards bank, which obtains the balance information and provides the balance information to the reward redemption platform. If the balance is greater than zero, the reward redemption platform identifies the issuer designated payment account that can be used to charge for a payment corresponding to rewards redeemed from a reward account and/or from a reward host. After the account information of the issuer designated account and the balance information are provided to the merchant as a response to the balance request, the merchant may use the account information to initiate a payment transaction in the payment processing network in which the issuer processor is connected. When the issuer processor receives the transaction request in the issuer designated payment account, the issuer processor makes the payment using a funding source reserved for the redemption of the rewards from the reward account and/or from the reward host. When the reward redemption platform receives the corresponding reward redemption request, the reward redemption platform communicates with the rewards bank to order the deduction of the rewards from the respective reward account. The payment is provided to the merchant from the issuer processor to the acquirer processor of the merchant in a way same as a payment is provided from a consumer payment account; and the issuer processor settles with the rewards bank for the funds paid out in the re In one embodiment, a user may visit the portal of the reward redemption platform to look up the reward balance in the reward account of the user and/or request the issuer designated payment account for the redemption of rewards from the reward accounts.

In an embodiment where the issuer designated payment account is specific to a reward account of a user, the user may provide the issuer designated payment account to the merchant system for a payment transaction funded by redeemed rewards. The merchant system is configured to initiate both the redemption request to the reward redemption platform and the authorization request for the payment in the issuer designated account using the account number of the issuer designated payment account. The reward redemption platform is configured to determine the reward account of the user based on the account number of the issuer designated payment account and data associating the reward account of the user and the account number of the issuer designated payment account.

In an embodiment where the issuer designated payment account is for a reward host or a set of different reward accounts hosted on the reward host, the user is required to identify both the issuer designated payment account and the reward account of the user to the merchant system for a payment transaction funded by redeemed rewards. The merchant system is configured to initiate the redemption request to the reward redemption platform using an identifier of the reward account of the user and the authorization request for the payment using the account number of the issuer designated account.

Figure 5:
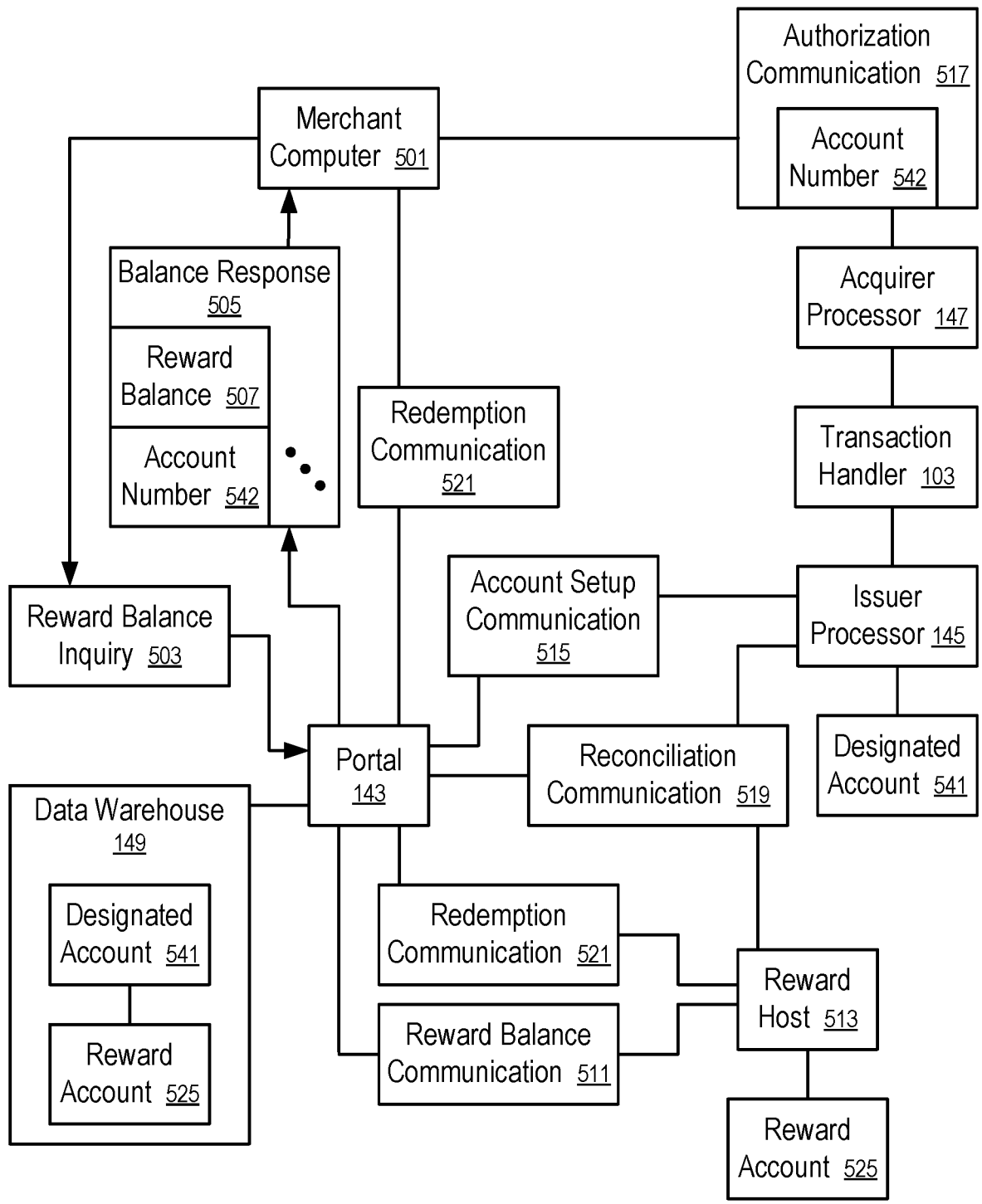
FIG. 5 shows a system to process reward redemption using a designated payment account according to one embodiment.

FIG. 5 shows a system to process reward redemption using a designated payment account according to one embodiment. In FIG. 5, a portal (143) is configured to communicate with the merchant computer (501), the issuer processor (145) of an issuer designated account (541) configured to have a funding source backed up the rewards in an reward account (525) and/or backed up the rewards provided by the reward host (513). The account (541) is designated for payments funded by the rewards.

In one embodiment, the issuer processor (145) of the account (541) designated by the issuer for payments funded by the rewards is implemented as a part of the transaction handler (103) which interconnects acquirer processors (e.g., 147) and issuer processors on the payment processing network (e.g., illustrated in FIG. 8).

In one embodiment, the designated account (525) is pre-allocated and associated with the reward account (525) of the user (101) (or a set of reward accounts hosted on the reward host (513), including the reward account (525) of the user (101)), via the account setup communication (515). Alternatively, the issuer processor (145) may allocate the issuer designated account (525) in response to a balance inquiry received in the portal (143).

In FIG. 5, when the merchant computer (501) sends a reward balance inquiry (503) to the portal (143) for the reward account (525), the portal (143) identifies the designated account (541) that is associated with the reward account (525) in the data warehouse (149). The designated account (541) may also be associated with other reward accounts hosted on the same reward host (513), if the designated account (541) is not specifically for the reward account (525). In one embodiment, the data warehouse (149) stores data associating the designated account (541) with the reward host (513) such that the same designated account (541) can be identified for a reward redemption from any of the reward accounts (e.g., 525) hosted on the reward host (513).

In FIG. 5, the portal (143) and the reward host (513) are configured to exchange reward balance communication (511) for reward accounts administered on the reward host (513). In response to the reward balance inquiry (503), the portal (143) obtains the current balance of the reward account (525) from the reward host (513) via the reward balance communication (511), and provides the balance response (505) that includes the reward balance (507) of the reward account (525) identified in the reward balance inquiry (503), and the account number (542) of the designated account (541) that is associated in the data warehouse (149) with the reward account (525).

In one embodiment, the designated account (541) is identified in the balance response (505) if the balance of the respective reward account (525) is above zero; and when the reward balance is zero, the account number (542) of the designated account (541) is not provided in the balance response (505).

The reward balance (507) may be specified in terms of a payment currency used in the issuer designated account (541) (e.g., issued by a government, such as U.S. dollar), or the reward currency identified by the reward host (513).

In one embodiment, the balance response (505) further includes an exchange rate between the reward currency used in the reward account (525) and/or for the rewards provided by the reward hosts (513) and the payment currency used in the designated account (541). Thus, the merchant computer (501) can be configured to prompt the user to redeem an amount in the reward currency, and request an amount of payment transaction in the designated account (541) in the payment currency.

The merchant computer (501) may present the reward balance (507) and be configured to allow the user to request the redemption of a reward amount that does not exceed the reward balance (507).

In one embodiment, the data warehouse (149) is further configured to store one or more preferences and/or rules for the redemption of rewards, which are used to calculate a suggested amount of rewards for redemption. The balance response (505) may include the suggested redemption amount. Thus, the merchant computer (501) is configured to present the suggested redemption amount for user confirmation (or initiate redemption without user manual confirmation).

In one embodiment, the merchant computer (501) includes a transaction terminal (105) connected to the acquirer processor (147) of the merchant. Using the account number (542), the transaction terminal (105) of the merchant can initiate an authorization communication (517) for a payment transaction in the designated account (541) associated with the reward account (525) and/or the reward host (513). The requested transaction amount corresponds to the value of the rewards to be redeemed.

In FIG. 5, the authorization communication (517) includes an authorization request transmitted from the merchant computer (501) to the issuer processor (145) via the acquirer processor (147) and the transaction handler (103), and an authorization response transmitted from the issuer processor (145) to the merchant computer (501) via the transaction handler (103) and the acquirer processor (147).

In FIG. 5, in response to the authorization request for the payment transaction in the designated account (541), the issuer processor (145) performs fraud risk assessment, budget check, etc. to determine whether nor not to reject the request for the payment transaction in the designated account (541).

In one embodiment, the issuer processor (145) does not have real time balance information for the reward account (525). Thus, the issuer processor (145) is configured to process of the authorization request for the payment transaction in the designated account (541) without the balance information of the reward account (525); and the issuer processor (145) does not cause the adjustment in the reward account (525) in view of the payment transaction in the designated account (541).

In FIG. 5, the merchant computer (501) is configured to perform a redemption communication (521), via the portal (143), with the reward host (513) to authorize the redemption based on the current reward balance of the reward account (525) and effect adjustment to the reward account (525) to take into the account of the redemption of rewards that are redeemed to fund the payment in the designated account (541).

For example, the merchant computer (501) identifies the redeemed amount from the reward account (525) to the portal (143), which forwards the redemption request to the corresponding reward host (513) of the reward account (525). If the reward host (513) authorizes the redemption request, the reward host (513) deducts the redeemed amount from the reward account (525) and transmits a redemption response to the merchant computer (501) via the portal (143).

When the issuer processor (145) approves the authorization request for the payment transaction in the designated account (541) and the reward host (513) approves the redemption request, the merchant computer (501) accepts the reward redemption payment made in the designated account (541). However, if the issuer processor (145) and/or the reward host (513) rejects a respective request for certain reasons, the merchant computer (501) rejects the reward redemption payment made in the designated account (541).

In one embodiment, the issuer processor (145) and the reward host (513) separately records the payment transactions in the designated account (541) and the redemption requests in the reward accounts (e.g., 525) hosted in the reward host (513). After a period of operation, the portal (143) facilities the reconciliation communication (519) to settle the funds used to pay for the transactions in the designated account (541) and/or to reverse the deduction of redeemed amounts that correspond to respective payment transactions rejected by the issuer processor (145).

In one embodiment, the redemption communication (521) is performed in response to that the corresponding payment transaction in the designated account (541) is approved by the issuer processor (145); and the redemption communication (521) is configured to provide information identifying the payment transaction (e.g., an authorization code for the payment transaction). Alternatively, the merchant computer (501) may perform the authorization communication (517) and the redemption communication (521) concurrently.

Figure 6:
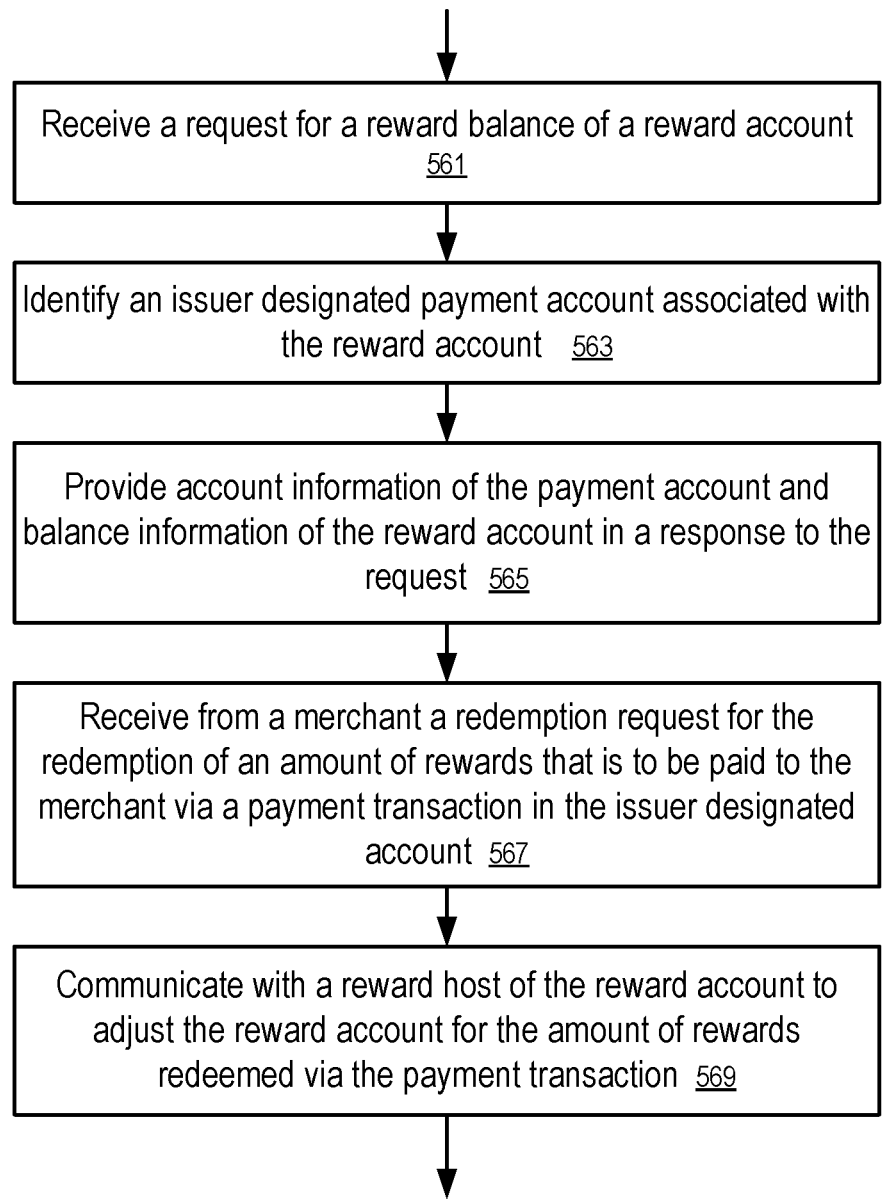
FIG. 6 shows a method to process reward redemption using a designated payment account according to one embodiment.

FIG. 6 shows a method to process reward redemption according to one embodiment. For example, the method of FIG. 6 can be implemented in a system illustrated in FIG. 5.

In FIG. 6, a computer apparatus is configured to: receive (561) a request for a reward balance of a reward account; identify (563) an issuer designated payment account associated with the reward account; provide (565) account information of the payment account and balance information of the reward account in a response to the request; receive (567) from a merchant a redemption request for the redemption of an amount of rewards that is to be paid to the merchant via a payment transaction in the issuer designated account; and communicate (569) with a reward host of the reward account to adjust the reward account for the amount of rewards redeemed via the payment transaction.

Figure 11:
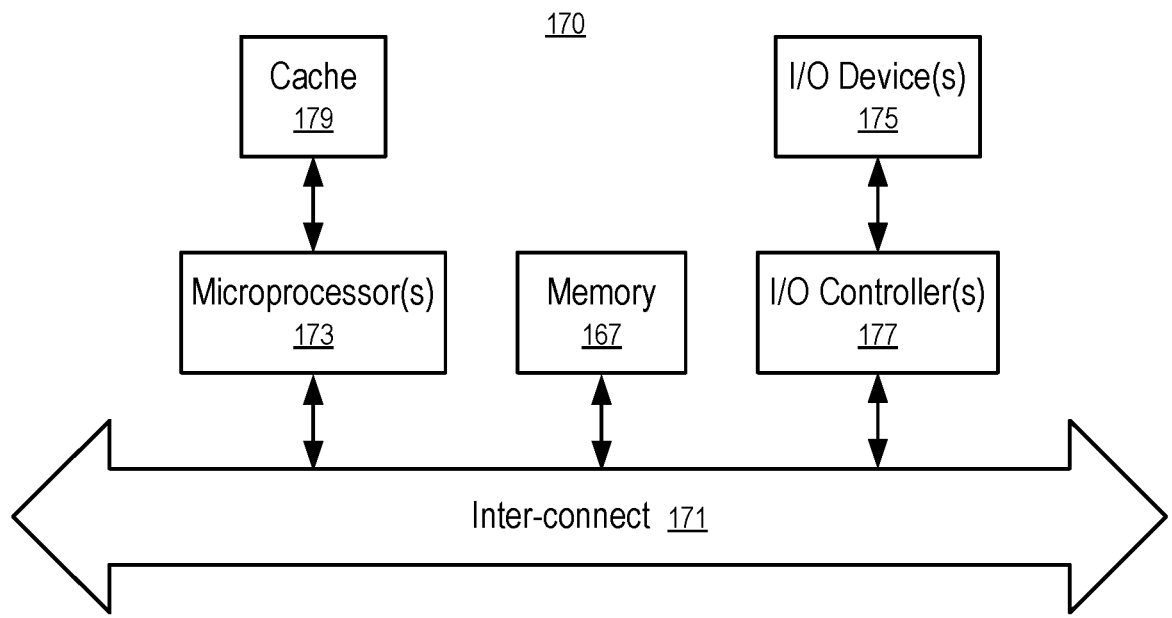
FIG. 11 illustrates a data processing system according to one embodiment.

In one embodiment, the computing apparatus includes one or more of: the portal (143), the issuer processor (145), the transaction handler (145), the reward host (513), the data warehouse (149), the transaction terminal (105) and the merchant computer (501), each of which can be implemented via one or more data processing systems illustrated FIG. 11. The computing apparatus can be further implemented, optionally, to perform other operations discussed below, such as the operations discussed in the section entitled "SYSTEM." Some of the hardware arrangements are discussed in the sections entitled "CENTRALIZED DATA WAREHOUSE" and "HARDWARE."

In one embodiment, a communication portal (311) is provided to have a communication link with a processing system (303), and a communication link with a host (309) having a first resource (307).

The communication portal (311) receives a first communication from a terminal (301) coupled with the processing system (303), where the first communication identifies the first resource (307), and the first communication is received from the terminal (301) in the communication portal (311) without going through the processing system (303).

In response to the first communication, the communication portal (311) identifies a second resource (305) addressable by the processing system (303), stores a data record (315) associating the first resource (307) and the second resource (305), and provides to the terminal (301) a response to the first communication to identify the second resource (305). Using the second resource (305) identified in the response, the terminal (301) can communicate with the processing system (303) using a communication protocol configured for operations on the second resource (305). The terminal (301) transmits a second communication to the processing system (303) using the communication protocol adapted for the second resource (305) as a way to indirectly request an operation on the first resource (307).

As illustrated in FIG. 1, the communication portal (311) communicates with the processing system (303) to identify a request for a first operation on the second resource (305), which request was communicated to the processing system (303) by the terminal (301) using the communication protocol adapted for the second resource (305). In response to the request and in accordance with the data record (315) associating the first resource (307) and the second resource (305), the communication portal (311) communicates with the host (309) of the first resource (307) to perform a second operation on the first resource (307).

For example, the processing system (303) of one embodiment includes an electronic payment processing network (e.g., as illustrated in FIG. 8) having a transaction handler (103) interconnecting a plurality of acquirer processors (e.g., 147) and a plurality of issuer processors (145); and the communication portal (e.g., 143) is coupled with the transaction handler (103) to receive a notification of the request for the first operation on the second resource (305).

For example, the first resource includes a reward account (525); the second resource (305) of one embodiment includes an issuer designated financial account (541) illustrated in FIG. 5. The account (541) is designated by the issuer processor (145) for making payments using funds corresponding to the redemption of rewards from the reward accounts (e.g., 525) hosted on the reward hosts (513).

FIG. 1 and FIG. 5 illustrate an example of portals (311 or 143) coupled with a host (309 or 513). The system can be readily expanded to include multiple hosts controlling multiple resources (e.g., 307), such as rewards accounts (525). Different rewards accounts (e.g., 525) and/or hosted on different hosts (e.g., 513) may use different reward currencies, such as points, miles, virtual cash, etc.

In FIG. 5, the resource (307) controlled by the host (513) is identified using an account number (542) issued by the issuer processor (145) to represent the issuer designated financial account (541).

In one embodiment, as illustrated in FIG. 5, the request for the first operation on the second resource (305) includes an authorization request (e.g., 517) transmitted via the electronic payment processing network, including the acquirer processor (147), the transaction handler (103), and the issuer processor (145) for a payment made using the issuer designated financial account (541).

In response to the detection of the authorization request (e.g., 517), the second operation on the first resource (307) includes the redemption of reward benefits from the reward account (525) to fund the issuer designated financial account (541) for the payment requested by the authorization request (e.g., 517).

As illustrated in FIG. 5, an example of the first communication from the terminal (301) to the communication portal (311) includes a request (503) for a balance (507) of the reward account (525). In FIG. 5, the balance inquiry (503) is transmitted from the merchant computer (501), such as a transaction terminal (105), to the portal (143) without going through the processing system (303). Thus, the communication protocol between the terminal (301) and the processing system (303) for operations on the resource B (305) does not have to be updated or extended to accommodate the operations or transactions on the reward accounts (525).

In one embodiment, the response to the first communication provided by the communication portal (311) to the terminal (301), such as the balance response (505) includes the balance (507), in addition to an identification of the issuer designated financial account (541), such as the account number (542) of the designated account (541). In some embodiments, the response further includes an exchange rate between a financial currency of the issuer designated account (541) and the reward benefits in the reward account (525), such that the merchant computer (501) may validate a redemption request in view of the reward balance (507) and compute the transaction amount in the designated account (541) based on the user requested amount of redeemed benefits.

For example the exchange rate can be specified as a ratio of the financial currency of the issuer designated account (541) of the reward benefits in the reward account (525). Multiplying the ratio by a redeemed amount of reward benefits provides the amount of financial currency to be paid using the designated account (541).

In one embodiment, the issuer processor (145) and the reward hosts (513) store data tracking the transactions made using the designated accounts (541) to facility the use of the redeemed benefits as a payment currency processed via the electronic payment processing network. Periodically, the portal (143) communicates with the issuer processor (145) of the issuer designated account (541) and the host (513) to settle funds for payments made in the issuer designated account (541) to redeem rewards controlled by the host (513). Combining multiple transactions/redemptions for a combined settlement increases the processing efficiency.

System

Figure 7:
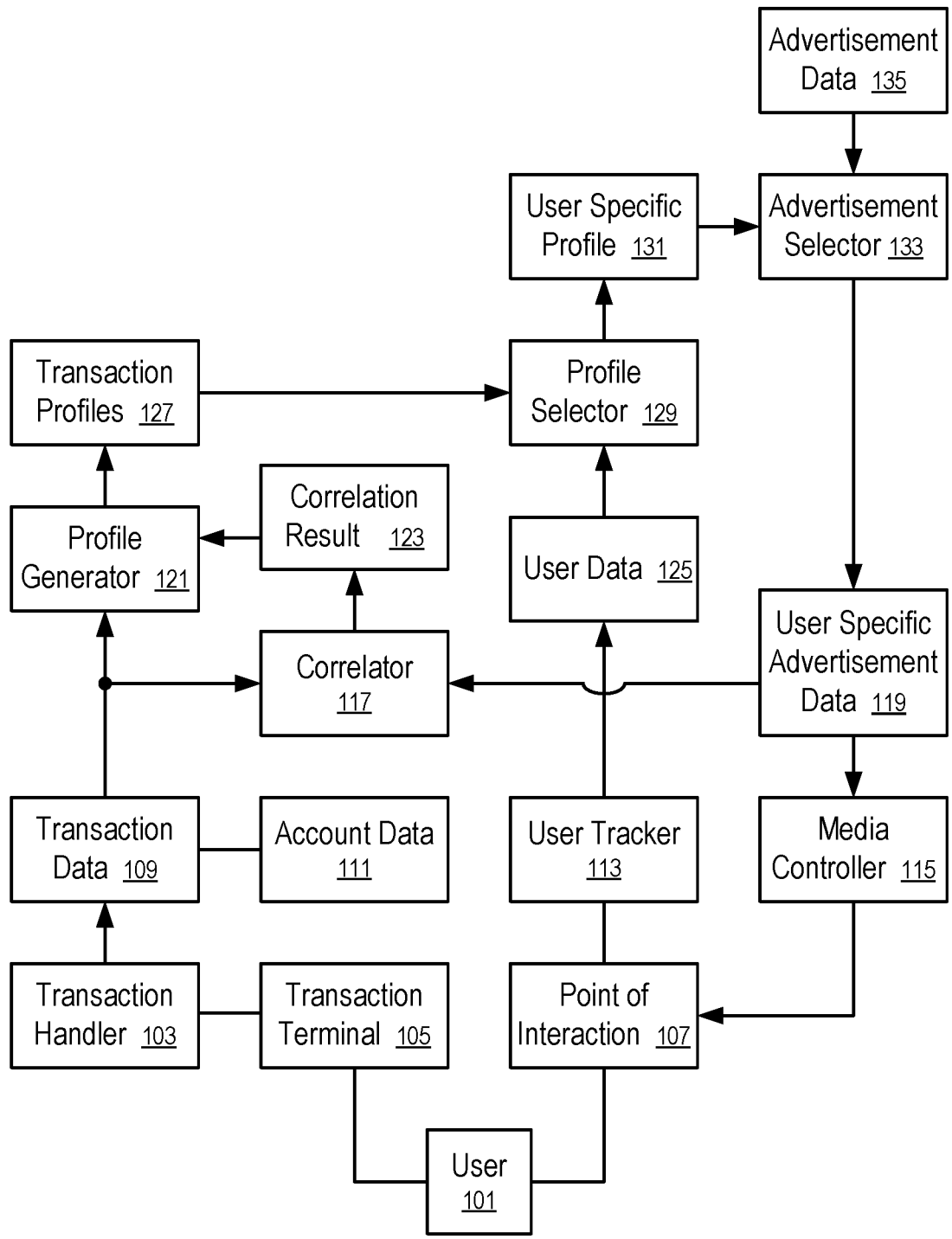
FIG. 7 illustrates a system to provide services based on transaction data according to one embodiment.

FIG. 7 illustrates a system to provide services based on transaction data according to one embodiment. In FIG. 7, the system includes a transaction terminal (105) to initiate financial transactions for a user (101), a transaction handler (103) to generate transaction data (109) from processing the financial transactions of the user (101) (and the financial transactions of other users), a profile generator (121) to generate transaction profiles (127) based on the transaction data (109) to provide information/intelligence about user preferences and spending patterns, a point of interaction (107) to provide information and/or offers to the user (101), a user tracker (113) to generate user data (125) to identify the user (101) using the point of interaction (107), a profile selector (129) to select a profile (131) specific to the user (101) identified by the user data (125), and an advertisement selector (133) to select, identify, generate, adjust, prioritize and/or personalize advertisements for presentation to the user (101) on the point of interaction (107) via a media controller (115).

In one embodiment, the system further includes a correlator (117) to correlate user specific advertisement data (119) with transactions resulting from the user specific advertisement data (119). The correlation results (123) can be used by the profile generator (121) to improve the transaction profiles (127).

The transaction profiles (127) of one embodiment are generated from the transaction data (109) in a way as illustrated in U.S. Pat. App. Pub. No. 2010/0306029, entitled "Cardholder Clusters," and U.S. Pat. App. Pub. No. 2010/0306032, entitled "Systems and Methods to Summarize Transaction Data," the disclosures of which applications are hereby in corporated herein by reference.

In one embodiment, a data warehouse (149) as illustrated in FIG. 8 is coupled with the transaction handler (103) to store the transaction data (109) and other data, such as account data (111), transaction profiles (127) and correlation results (123). In FIG. 8, a portal (143) is coupled with the data warehouse (149) to provide data or information derived from the transaction data (109), in response to a query request from a third party or as an alert or notification message.

In FIG. 8, the transaction handler (103) is coupled between an issuer processor (145) in control of a consumer account (146) and an acquirer processor (147) in control of a merchant account (148). An account identification device (141) is configured to carry the account information (142) that identifies the consumer account (146) with the issuer processor (145) and provide the account information (142) to the transaction terminal (105) of a merchant to initiate a transaction between the user (101) and the merchant.

Figure 9:
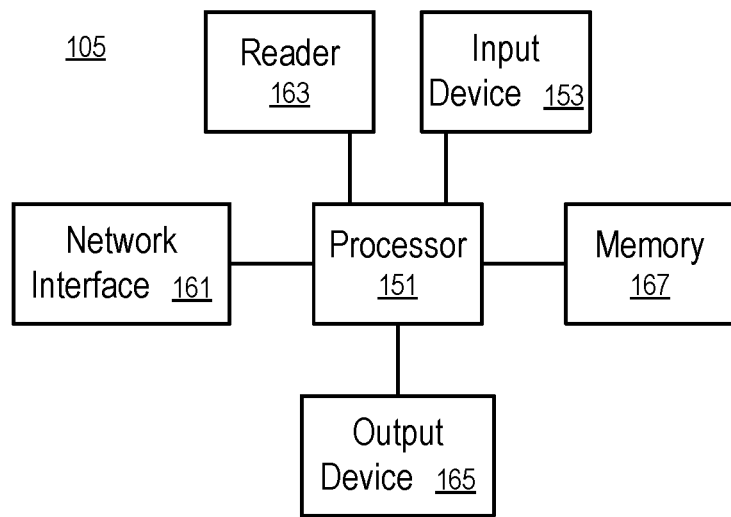
FIG. 9 illustrates a transaction terminal according to one embodiment.
Figure 10:
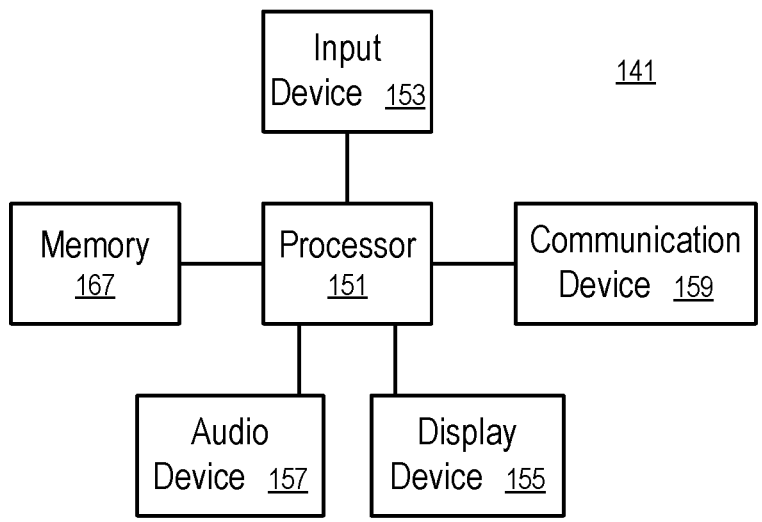
FIG. 10 illustrates an account identifying device according to one embodiment.

FIGS. 9 and 10 illustrate examples of transaction terminals (105) and account identification devices (141). FIG. 11 illustrates the structure of a data processing system that can be used to implement, with more or fewer elements, at least some of the components in the system, such as the point of interaction (107), the transaction handler (103), the portal (143), the data warehouse (149), the account identification device (141), the transaction terminal (105), the user tracker (113), the profile generator (121), the profile selector (129), the advertisement selector (133), the media controller (115), etc. Some embodiments use more or fewer components than those illustrated in FIGS. 7-11.

In one embodiment, the transaction data (109) relates to financial transactions processed by the transaction handler (103); and the account data (111) relates to information about the account holders involved in the transactions. Further data, such as merchant data that relates to the location, business, products and/or services of the merchants that receive payments from account holders for their purchases, can be used in the generation of the transaction profiles (127).

In one embodiment, the financial transactions are made via an account identification device (141), such as financial transaction cards (e.g., credit cards, debit cards, banking cards, etc.); the financial transaction cards may be embodied in various devices, such as plastic cards, chips, radio frequency identification (RFID) devices, mobile phones, personal digital assistants (PDAs), etc.; and the financial transaction cards may be represented by account identifiers (e.g., account numbers or aliases). In one embodiment, the financial transactions are made via directly using the account information (142), without physically presenting the account identification device (141).

Further features, modifications and details are provided in various sections of this description.

Centralized Data Warehouse

In one embodiment, the transaction handler (103) maintains a centralized data warehouse (149) organized around the transaction data (109). For example, the centralized data warehouse (149) may include, and/or support the determination of, spending band distribution, transaction count and amount, merchant categories, merchant by state, cardholder segmentation by velocity scores, and spending within merchant target, competitive set and cross-section.

In one embodiment, the centralized data warehouse (149) provides centralized management but allows decentralized execution. For example, a third party strategic marketing analyst, statistician, marketer, promoter, business leader, etc., may access the centralized data warehouse (149) to analyze customer and shopper data, to provide follow-up analyses of customer contributions, to develop propensity models for increased conversion of marketing campaigns, to develop segmentation models for marketing, etc. The centralized data warehouse (149) can be used to manage advertisement campaigns and analyze response profitability.

In one embodiment, the centralized data warehouse (149) includes merchant data (e.g., data about sellers), customer/business data (e.g., data about buyers), and transaction records between sellers and buyers over time. The centralized data warehouse (149) can be used to support corporate sales forecasting, fraud analysis reporting, sales/customer relationship management (CRM) business intelligence, credit risk prediction and analysis, advanced authorization reporting, merchant benchmarking, business intelligence for small business, rewards, etc.

In one embodiment, the transaction data (109) is combined with external data, such as surveys, benchmarks, search engine statistics, demographics, competition information, emails, etc., to flag key events and data values, to set customer, merchant, data or event triggers, and to drive new transactions and new customer contacts.

Transaction Profile

In FIG. 7, the profile generator (121) generates transaction profiles (127) based on the transaction data (109), the account data (111), and/or other data, such as non-transactional data, wish lists, merchant provided information, address information, information from social network websites, information from credit bureaus, information from search engines, and other examples discussed in U.S. Pat. App. Pub. No. 2011/0054981, entitled "Analyzing Local Non-Transactional Data with Transactional Data in Predictive Models," the disclosure of which is hereby incorporated herein by reference.

In one embodiment, the transaction profiles (127) provide intelligence information on the behavior, pattern, preference, propensity, tendency, frequency, trend, and budget of the user (101) in making purchases. In one embodiment, the transaction profiles (127) include information about what the user (101) owns, such as points, miles, or other rewards currency, available credit, and received offers, such as coupons loaded into the accounts of the user (101). In one embodiment, the transaction profiles (127) include information based on past offer/coupon redemption patterns. In one embodiment, the transaction profiles (127) include information on shopping patterns in retail stores as well as online, including frequency of shopping, amount spent in each shopping trip, distance of merchant location (retail) from the address of the account holder(s), etc.

In one embodiment, the transaction handler (103) provides at least part of the intelligence for the prioritization, generation, selection, customization and/or adjustment of an advertisement for delivery within a transaction process involving the transaction handler (103). For example, the advertisement may be presented to a customer in response to the customer making a payment via the transaction handler (103).

Some of the transaction profiles (127) are specific to the user (101), or to an account of the user (101), or to a group of users of which the user (101) is a member, such as a household, family, company, neighborhood, city, or group identified by certain characteristics related to online activities, offline purchase activities, merchant propensity, etc.

In one embodiment, the profile generator (121) generates and updates the transaction profiles (127) in batch mode periodically. In other embodiments, the profile generator (121) generates the transaction profiles (127) in real-time, or just in time, in response to a request received in the portal (143) for such profiles.

In one embodiment, the transaction profiles (127) include the values for a set of parameters. Computing the values of the parameters may involve counting transactions that meet one or more criteria, and/or building a statistically-based model in which one or more calculated values or transformed values are put into a statistical algorithm that weights each value to optimize its collective predictiveness for various predetermined purposes.

Further details and examples about the transaction profiles (127) in one embodiment are provided in the section entitled "AGGREGATED SPENDING PROFILE."

In FIG. 7, an advertisement selector (133) prioritizes, generates, selects, adjusts, and/or customizes the available advertisement data (135) to provide user specific advertisement data (119) based at least in part on the user specific profile (131). The advertisement selector (133) uses the user specific profile (131) as a filter and/or a set of criteria to generate, identify, select and/or prioritize advertisement data for the user (101). A media controller (115) delivers the user specific advertisement data (119) to the point of interaction (107) for presentation to the user (101) as the targeted and/or personalized advertisement.

In one embodiment, the user data (125) includes the characterization of the context at the point of interaction (107). Thus, the use of the user specific profile (131), selected using the user data (125), includes the consideration of the context at the point of interaction (107) in selecting the user specific advertisement data (119).

In one embodiment, in selecting the user specific advertisement data (119), the advertisement selector (133) uses not only the user specific profile (131), but also information regarding the context at the point of interaction (107). For example, in one embodiment, the user data (125) includes information regarding the context at the point of interaction (107); and the advertisement selector (133) explicitly uses the context information in the generation or selection of the user specific advertisement data (119).

In one embodiment, the advertisement selector (133) may query for specific information regarding the user (101) before providing the user specific advertisement data (119). The queries may be communicated to the operator of the transaction handler (103) and, in particular, to the transaction handler (103) or the profile generator (121). For example, the queries from the advertisement selector (133) may be transmitted and received in accordance with an application programming interface or other query interface of the transaction handler (103), the profile generator (121) or the portal (143) of the transaction handler (103).

In one embodiment, the queries communicated from the advertisement selector (133) may request intelligence information regarding the user (101) at any level of specificity (e.g., segment level, individual level). For example, the queries may include a request for a certain field or type of information in a cardholder's aggregated spending profile. As another example, the queries may include a request for the spending level of the user (101) in a certain merchant category over a prior time period (e.g., six months).

In one embodiment, the advertisement selector (133) is operated by an entity that is separate from the entity that operates the transaction handler (103). For example, the advertisement selector (133) may be operated by a search engine, a publisher, an advertiser, an ad network, or an online merchant. The user specific profile (131) is provided to the advertisement selector (133) to assist in the customization of the user specific advertisement data (119).

In one embodiment, advertising is targeted based on shopping patterns in a merchant category (e.g., as represented by a Merchant Category Code (MCC)) that has high correlation of spending propensity with other merchant categories (e.g., other MCCs). For example, in the context of a first MCC for a targeted audience, a profile identifying second MCCs that have high correlation of spending propensity with the first MCC can be used to select advertisements for the targeted audience.

In one embodiment, the aggregated spending profile is used to provide intelligence information about the spending patterns, preferences, and/or trends of the user (101). For example, a predictive model can be established based on the aggregated spending profile to estimate the needs of the user (101). For example, the factor values and/or the cluster ID in the aggregated spending profile can be used to determine the spending preferences of the user (101). For example, the channel distribution in the aggregated spending profile can be used to provide a customized offer targeted for a particular channel, based on the spending patterns of the user (101).

In one embodiment, mobile advertisements, such as offers and coupons, are generated and disseminated based on aspects of prior purchases, such as timing, location, and nature of the purchases, etc. In one embodiment, the size of the benefit of the offer or coupon is based on purchase volume or spending amount of the prior purchase and/or the subsequent purchase that may qualify for the redemption of the offer. Further details and examples of one embodiment are provided in U.S. Pat. App. Pub. No. 2008/0201226, entitled "Mobile Coupon Method and Portable Consumer Device for Utilizing Same," the disclosure of which is hereby incorporated herein by reference.

In one embodiment, conditional rewards are provided to the user (101); and the transaction handler (103) monitors the transactions of the user (101) to identify redeemable rewards that have satisfied the respective conditions. In one embodiment, the conditional rewards are selected based on transaction data (109). Further details and examples of one embodiment are provided in U.S. Pat. App. Pub. No. 2008/0082418, entitled "Consumer Specific Conditional Rewards," the disclosure of which is hereby incorporated herein by reference. The techniques to detect the satisfied conditions of conditional rewards can also be used to detect the transactions that satisfy the conditions specified to locate the transactions that result from online activities, such as online advertisements, searches, etc., to correlate the transactions with the respective online activities.

Further details about targeted offer delivery in one embodiment are provided in U.S. Pat. App. Pub. No. 2010/0030644, entitled "Targeted Advertising by Payment Processor History of Cashless Acquired Merchant Transaction on Issued Consumer Account," and in U.S. Pat. App. Pub. No. 2011/0035280, entitled "Systems and Methods for Targeted Advertisement Delivery, the disclosures of which applications are hereby incorporated herein by reference.

Aggregated Spending Profile

In one embodiment, the characteristics of transaction patterns of customers are profiled via clusters, factors, and/or categories of purchases. The transaction data (109) may include transaction records; and in one embodiment, an aggregated spending profile is generated from the transaction records to summarize the spending behavior reflected in the transaction records, in a way illustrated in U.S. Pat. App. Pub. No. 2010/0306029, entitled "Cardholder Clusters," and U.S. Pat. App. Pub. No. 2010/0306032, entitled "Systems and Methods to Summarize Transaction Data," the disclosures of which applications are hereby incorporated herein by reference.

In one embodiment, each of the transaction records is for a particular transaction processed by the transaction handler (103). Each of the transaction records provides information about the particular transaction, such as the account number of the consumer account (146) used to pay for the purchase, the date (and/or time) of the transaction, the amount of the transaction, the ID of the merchant who receives the payment, the category of the merchant, the channel through which the purchase was made, etc. Examples of channels include online, offline in-store, via phone, etc. In one embodiment, the transaction records may further include a field to identify a type of transaction, such as card-present, card-not-present, etc.

In one embodiment, a "card-present" transaction involves physically presenting the account identification device (141), such as a financial transaction card, to the merchant (e.g., via swiping a credit card at a POS terminal of a merchant); and a "card-not-present" transaction involves presenting the account information (142) of the consumer account (146) to the merchant to identify the consumer account (146) without physically presenting the account identification device (141) to the merchant or the transaction terminal (105).

In one embodiment, certain information about the transaction can be looked up in a separate database based on other information recorded for the transaction. For example, a database may be used to store information about merchants, such as the geographical locations of the merchants, categories of the merchants, etc. Thus, the corresponding merchant information related to a transaction can be determined using the merchant ID recorded for the transaction.

In one embodiment, the transaction records may further include details about the products and/or services involved in the purchase. For example, a list of items purchased in the transaction may be recorded together with the respective purchase prices of the items and/or the respective quantities of the purchased items. The products and/or services can be identified via stock-keeping unit (SKU) numbers, or product category IDs. The purchase details may be stored in a separate database and be looked up based on an identifier of the transaction.

When there is voluminous data representing the transaction records, the spending patterns reflected in the transaction records can be difficult to recognize by an ordinary person.

In one embodiment, the voluminous transaction records are summarized into aggregated spending profiles to concisely present the statistical spending characteristics reflected in the transaction records. The aggregated spending profile uses values derived from statistical analysis to present the statistical characteristics of transaction records of an entity in a way easy to understand by an ordinary person.

Details about aggregated spending profiles of some embodiments are provided in U.S. Pat. App. Pub. No. 2010/0306029, entitled "Cardholder Clusters," and U.S. Pat. App. Pub. No. 2010/0306032, entitled "Systems and Methods to Summarize Transaction Data," the disclosures of which applications are hereby incorporated herein by reference.

Transaction Data Based Portal

In FIG. 7, the transaction terminal (105) initiates the transaction for a user (101) (e.g., a customer) for processing by a transaction handler (103). The transaction handler (103) processes the transaction and stores transaction data (109) about the transaction, in connection with account data (111), such as the account profile of an account of the user (101). The account data (111) may further include data about the user (101), collected from issuers or merchants, and/or other sources, such as social networks, credit bureaus, merchant provided information, address information, etc. In one embodiment, a transaction may be initiated by a server (e.g., based on a stored schedule for recurrent payments).

Over a period of time, the transaction handler (103) accumulates the transaction data (109) from transactions initiated at different transaction terminals (e.g., 105) for different users (e.g., 101). The transaction data (109) thus includes information on purchases made by various users (e.g., 101) at various times via different purchases options (e.g., online purchase, offline purchase from a retail store, mail order, order via phone, etc.)

In one embodiment, the accumulated transaction data (109) and the corresponding account data (111) are used to generate intelligence information about the purchase behavior, pattern, preference, tendency, frequency, trend, amount and/or propensity of the users (e.g., 101), as individuals or as a member of a group. The intelligence information can then be used to generate, identify and/or select targeted advertisements for presentation to the user (101) on the point of interaction (107), during a transaction, after a transaction, or when other opportunities arise.

FIG. 8 shows a system to provide information based on transaction data (109) according to one embodiment. In FIG. 8, the transaction handler (103) is coupled between an issuer processor (145) and an acquirer processor (147) to facilitate authorization and settlement of transactions between a consumer account (146) and a merchant account (148). The transaction handler (103) records the transactions in the data warehouse (149). The portal (143) is coupled to the data warehouse (149) to provide information based on the transaction records, such as the transaction profiles (127) or aggregated spending profile. The portal (143) may be implemented as a web portal, a telephone gateway, a file/data server, etc.

In one embodiment, the portal (143) is configured to receive queries identifying search criteria from the profile selector (129), the advertisement selector (133) and/or third parties and in response, to provide transaction-based intelligence requested by the queries.

For example, in one embodiment, a query is to specify a plurality of account holders to request the portal (143) to deliver the transaction profiles (127) of account holders in a batch mode.

For example, in one embodiment, a query is to identify the user (101) to request the user specific profile (131), or the aggregated spending profile, of the user (101). The user (101) may be identified using the account data (111), such as the account number, or the user data (125) such as browser cookie ID, IP address, etc.

For example, in one embodiment, a query is to identify a retail location; and the portal (143) is to provide a profile (e.g., 341) that summarizes the aggregated spending patterns of users who have shopped at the retail location within a period of time.

For example, in one embodiment, a query is to identify a geographical location; and the portal (143) is to provide a profile (e.g., 341) that summarizes the aggregated spending patterns of users who have been to, or who are expected to visit, the geographical location within a period of time (e.g., as determined or predicted based on the locations of the point of interactions (e.g., 107) of the users).

For example, in one embodiment, a query is to identify a geographical area; and the portal (143) is to provide a profile (e.g., 341) that summarizes the aggregated spending patterns of users who reside in the geographical area (e.g., as determined by the account data (111), or who have made transactions within the geographical area with a period of time (e.g., as determined by the locations of the transaction terminals (e.g., 105) used to process the transactions).

In one embodiment, the portal (143) is configured to register certain users (101) for various programs, such as a loyalty program to provide rewards and/or offers to the users (101).

In one embodiment, the portal (143) is to register the interest of users (101), or to obtain permissions from the users (101) to gather further information about the users (101), such as data capturing purchase details, online activities, etc.

In one embodiment, the user (101) may register via the issuer; and the registration data in the consumer account (146) may propagate to the data warehouse (149) upon approval from the user (101).

In one embodiment, the portal (143) is to register merchants and provide services and/or information to merchants.

In one embodiment, the portal (143) is to receive information from third parties, such as search engines, merchants, websites, etc. The third party data can be correlated with the transaction data (109) to identify the relationships between purchases and other events, such as searches, news announcements, conferences, meetings, etc., and improve the prediction capability and accuracy.

In FIG. 8, the consumer account (146) is under the control of the issuer processor (145). The consumer account (146) may be owned by an individual, or an organization such as a business, a school, etc. The consumer account (146) may be a credit account, a debit account, or a stored value account. The issuer may provide the consumer (e.g., user (101)) an account identification device (141) to identify the consumer account (146) using the account information (142). The respective consumer of the account (146) can be called an account holder or a cardholder, even when the consumer is not physically issued a card, or the account identification device (141), in one embodiment. The issuer processor (145) is to charge the consumer account (146) to pay for purchases.

In one embodiment, the account identification device (141) is a plastic card having a magnetic strip storing account information (142) identifying the consumer account (146) and/or the issuer processor (145). Alternatively, the account identification device (141) is a smartcard having an integrated circuit chip storing at least the account information (142). In one embodiment, the account identification device (141) includes a mobile phone having an integrated smartcard.

In one embodiment, the account information (142) is printed or embossed on the account identification device (141). The account information (142) may be printed as a bar code to allow the transaction terminal (105) to read the information via an optical scanner. The account information (142) may be stored in a memory of the account identification device (141) and configured to be read via wireless, contactless communications, such as near field communications via magnetic field coupling, infrared communications, or radio frequency communications. Alternatively, the transaction terminal (105) may require contact with the account identification device (141) to read the account information (142) (e.g., by reading the magnetic strip of a card with a magnetic strip reader).

In one embodiment, the transaction terminal (105) is configured to transmit an authorization request message to the acquirer processor (147). The authorization request includes the account information (142), an amount of payment, and information about the merchant (e.g., an indication of the merchant account (148)). The acquirer processor (147) requests the transaction handler (103) to process the authorization request, based on the account information (142) received in the transaction terminal (105). The transaction handler (103) routes the authorization request to the issuer processor (145) and may process and respond to the authorization request when the issuer processor (145) is not available. The issuer processor (145) determines whether to authorize the transaction based at least in part on a balance of the consumer account (146).

In one embodiment, the transaction handler (103), the issuer processor (145), and the acquirer processor (147) may each include a subsystem to identify the risk in the transaction and may reject the transaction based on the risk assessment.

In one embodiment, the account identification device (141) includes security features to prevent unauthorized uses of the consumer account (146), such as a logo to show the authenticity of the account identification device (141), encryption to protect the account information (142), etc.

In one embodiment, the transaction terminal (105) is configured to interact with the account identification device (141) to obtain the account information (142) that identifies the consumer account (146) and/or the issuer processor (145). The transaction terminal (105) communicates with the acquirer processor (147) that controls the merchant account (148) of a merchant. The transaction terminal (105) may communicate with the acquirer processor (147) via a data communication connection, such as a telephone connection, an Internet connection, etc. The acquirer processor (147) is to collect payments into the merchant account (148) on behalf of the merchant.

In one embodiment, the transaction terminal (105) is a POS terminal at a traditional, offline, "brick and mortar" retail store. In another embodiment, the transaction terminal (105) is an online server that receives account information (142) of the consumer account (146) from the user (101) through a web connection. In one embodiment, the user (101) may provide account information (142) through a telephone call, via verbal communications with a representative of the merchant; and the representative enters the account information (142) into the transaction terminal (105) to initiate the transaction.

In one embodiment, the account information (142) can be entered directly into the transaction terminal (105) to make payment from the consumer account (146), without having to physically present the account identification device (141). When a transaction is initiated without physically presenting an account identification device (141), the transaction is classified as a "card-not-present" (CNP) transaction.

In one embodiment, the issuer processor (145) may control more than one consumer account (146); the acquirer processor (147) may control more than one merchant account (148); and the transaction handler (103) is connected between a plurality of issuer processors (e.g., 145) and a plurality of acquirer processors (e.g., 147). An entity (e.g., bank) may operate both an issuer processor (145) and an acquirer processor (147).

In one embodiment, the transaction handler (103), the issuer processor (145), the acquirer processor (147), the transaction terminal (105), the portal (143), and other devices and/or services accessing the portal (143) are connected via communications networks, such as local area networks, cellular telecommunications networks, wireless wide area networks, wireless local area networks, an intranet, and Internet. In one embodiment, dedicated communication channels are used between the transaction handler (103) and the issuer processor (145), between the transaction handler (103) and the acquirer processor (147), and/or between the portal (143) and the transaction handler (103).

In one embodiment, the transaction handler (103) uses the data warehouse (149) to store the records about the transactions, such as the transaction records or transaction data (109). In one embodiment, the transaction handler (103) includes a powerful computer, or cluster of computers functioning as a unit, controlled by instructions stored on a computer readable medium.

In one embodiment, the transaction handler (103) is configured to support and deliver authorization services, exception file services, and clearing and settlement services. In one embodiment, the transaction handler (103) has a subsystem to process authorization requests and another subsystem to perform clearing and settlement services.

In one embodiment, the transaction handler (103) is configured to process different types of transactions, such credit card transactions, debit card transactions, prepaid card transactions, and other types of commercial transactions.

In one embodiment, the transaction handler (103) facilitates the communications between the issuer processor (145) and the acquirer processor (147).

In one embodiment, the transaction handler (103) is coupled to the portal (143) (and/or the profile selector (129), the advertisement selector (133), the media controller (115)) to charge the fees for the services of providing the transaction-based intelligence information and/or advertisement.

For example, in one embodiment, the system illustrated in FIG. 7 is configured to deliver advertisements to the point of interaction (107) of the user (101), based on the transaction-based intelligence information; and the transaction handler (103) is configured to charge the advertisement fees to the account of the advertiser in communication with the issuer processor in control of the account of the advertiser. The advertisement fees may be charged in response to the presentation of the advertisement, or in response to the completion of a pre-determined number of presentations, or in response to a transaction resulted from the presentation of the advertisement. In one embodiment, the transaction handler (103) is configured to a periodic fee (e.g., monthly fee, annual fee) to the account of the advertiser in communication with the respective issuer processor that is similar to the issuer processor (145) of the consumer account (146).

For example, in one embodiment, the portal (143) is configured to provide transaction-based intelligence information in response to the queries received in the portal (143). The portal (143) is to identify the requesters (e.g., via an authentication, or the address of the requesters) and instruct the transaction handler (103) to charge the consumer accounts (e.g., 146) of the respective requesters for the transaction-based intelligence information. In one embodiment, the accounts of the requesters are charged in response to the delivery of the intelligence information via the portal (143). In one embodiment, the accounts of the requesters are charged a periodic subscription fee for the access to the query capability of the portal (143).

In one embodiment, the information service provided by the system illustrated in FIG. 7 includes multiple parties, such as one entity operating the transaction handler (103), one entity operating the advertisement data (135), one entity operating the user tracker (113), one entity operating the media controller (115), etc. The transaction handler (103) is used to generate transactions to settle the fees, charges and/or divide revenues using the accounts of the respective parties. In one embodiment, the account information of the parties is stored in the data warehouse (149) coupled to the transaction handler (103). In some embodiments, a separate billing engine is used to generate the transactions to settle the fees, charges and/or divide revenues.

In one embodiment, the transaction terminal (105) is configured to submit the authorized transactions to the acquirer processor (147) for settlement. The amount for the settlement may be different from the amount specified in the authorization request. The transaction handler (103) is coupled between the issuer processor (145) and the acquirer processor (147) to facilitate the clearing and settling of the transaction. Clearing includes the exchange of financial information between the issuer processor (145) and the acquirer processor (147); and settlement includes the exchange of funds.

In one embodiment, the issuer processor (145) is to provide funds to make payments on behalf of the consumer account (146). The acquirer processor (147) is to receive the funds on behalf of the merchant account (148). The issuer processor (145) and the acquirer processor (147) communicate with the transaction handler (103) to coordinate the transfer of funds for the transaction. In one embodiment, the funds are transferred electronically.

In one embodiment, the transaction terminal (105) may submit a transaction directly for settlement, without having to separately submit an authorization request.

In one embodiment, the portal (143) provides a user interface to allow the user (101) to organize the transactions in one or more consumer accounts (146) of the user with one or more issuers. The user (101) may organize the transactions using information and/or categories identified in the transaction records, such as merchant category, transaction date, amount, etc. Examples and techniques in one embodiment are provided in U.S. Pat. App. Pub. No. 2007/0055597, entitled "Method and System for Manipulating Purchase Information," the disclosure of which is hereby incorporated herein by reference.

In one embodiment, the portal (143) provides transaction based statistics, such as indicators for retail spending monitoring, indicators for merchant benchmarking, industry/market segmentation, indicators of spending patterns, etc. Further examples can be found in U.S. Pat. App. Pub. No. 2009/0048884, entitled "Merchant Benchmarking Tool," the disclosure of which application is hereby incorporated herein by reference.

Transaction Terminal

FIG. 9 illustrates a transaction terminal according to one embodiment. In FIG. 9, the transaction terminal (105) is configured to interact with an account identification device (141) to obtain account information (142) about the consumer account (146).

In one embodiment, the transaction terminal (105) includes a memory (167) coupled to the processor (151), which controls the operations of a reader (163), an input device (153), an output device (165) and a network interface (161). The memory (167) may store instructions for the processor (151) and/or data, such as an identification that is associated with the merchant account (148).

In one embodiment, the reader (163) includes a magnetic strip reader. In another embodiment, the reader (163) includes a contactless reader, such as a radio frequency identification (RFID) reader, a near field communications (NFC) device configured to read data via magnetic field coupling (in accordance with ISO standard 14443/NFC), a Bluetooth transceiver, a WiFi transceiver, an infrared transceiver, a laser scanner, etc.

In one embodiment, the input device (153) includes key buttons that can be used to enter the account information (142) directly into the transaction terminal (105) without the physical presence of the account identification device (141). The input device (153) can be configured to provide further information to initiate a transaction, such as a personal identification number (PIN), password, zip code, etc. that may be used to access the account identification device (141), or in combination with the account information (142) obtained from the account identification device (141).

In one embodiment, the output device (165) may include a display, a speaker, and/or a printer to present information, such as the result of an authorization request, a receipt for the transaction, an advertisement, etc.

In one embodiment, the network interface (161) is configured to communicate with the acquirer processor (147) via a telephone connection, an Internet connection, or a dedicated data communication channel.

In one embodiment, the instructions stored in the memory (167) are configured at least to cause the transaction terminal (105) to send an authorization request message to the acquirer processor (147) to initiate a transaction. The transaction terminal (105) may or may not send a separate request for the clearing and settling of the transaction. The instructions stored in the memory (167) are also configured to cause the transaction terminal (105) to perform other types of functions discussed in this description.

In one embodiment, a transaction terminal (105) may have fewer components than those illustrated in FIG. 9. For example, in one embodiment, the transaction terminal (105) is configured for "card-not-present" transactions; and the transaction terminal (105) does not have a reader (163).

In one embodiment, a transaction terminal (105) may have more components than those illustrated in FIG. 9. For example, in one embodiment, the transaction terminal (105) is an ATM machine, which includes components to dispense cash under certain conditions.

Account Identification Device

FIG. 10 illustrates an account identifying device according to one embodiment. In FIG. 10, the account identification device (141) is configured to carry account information (142) that identifies the consumer account (146).

In one embodiment, the account identification device (141) includes a memory (167) coupled to the processor (151), which controls the operations of a communication device (159), an input device (153), an audio device (157) and a display device (155). The memory (167) may store instructions for the processor (151) and/or data, such as the account information (142) associated with the consumer account (146).

In one embodiment, the account information (142) includes an identifier identifying the issuer (and thus the issuer processor (145)) among a plurality of issuers, and an identifier identifying the consumer account among a plurality of consumer accounts controlled by the issuer processor (145). The account information (142) may include an expiration date of the account identification device (141), the name of the consumer holding the consumer account (146), and/or an identifier identifying the account identification device (141) among a plurality of account identification devices associated with the consumer account (146).

In one embodiment, the account information (142) may further include a loyalty program account number, accumulated rewards of the consumer in the loyalty program, an address of the consumer, a balance of the consumer account (146), transit information (e.g., a subway or train pass), access information (e.g., access badges), and/or consumer information (e.g., name, date of birth), etc.

In one embodiment, the memory includes a nonvolatile memory, such as magnetic strip, a memory chip, a flash memory, a Read Only Memory (ROM), etc. to store the account information (142).

In one embodiment, the information stored in the memory (167) of the account identification device (141) may also be in the form of data tracks that are traditionally associated with credits cards. Such tracks include Track 1 and Track 2. Track 1 ("International Air Transport Association") stores more information than Track 2, and contains the cardholder's name as well as the account number and other discretionary data. Track 1 is sometimes used by airlines when securing reservations with a credit card. Track 2 ("American Banking Association") is currently most commonly used and is read by ATMs and credit card checkers. The ABA (American Banking Association) designed the specifications of Track 1 and banks abide by it. It contains the cardholder's account number, encrypted PIN, and other discretionary data.

In one embodiment, the communication device (159) includes a semiconductor chip to implement a transceiver for communication with the reader (163) and an antenna to provide and/or receive wireless signals.

In one embodiment, the communication device (159) is configured to communicate with the reader (163). The communication device (159) may include a transmitter to transmit the account information (142) via wireless transmissions, such as radio frequency signals, magnetic coupling, or infrared, Bluetooth or WiFi signals, etc.

In one embodiment, the account identification device (141) is in the form of a mobile phone, personal digital assistant (PDA), etc. The input device (153) can be used to provide input to the processor (151) to control the operation of the account identification device (141); and the audio device (157) and the display device (155) may present status information and/or other information, such as advertisements or offers. The account identification device (141) may include further components that are not shown in FIG. 10, such as a cellular communications subsystem.

In one embodiment, the communication device (159) may access the account information (142) stored on the memory (167) without going through the processor (151).

In one embodiment, the account identification device (141) has fewer components than those illustrated in FIG. 10. For example, an account identification device (141) does not have the input device (153), the audio device (157) and the display device (155) in one embodiment; and in another embodiment, an account identification device (141) does not have components (151-159).

For example, in one embodiment, an account identification device (141) is in the form of a debit card, a credit card, a smartcard, or a consumer device that has optional features such as magnetic strips, or smartcards.

An example of an account identification device (141) is a magnetic strip attached to a plastic substrate in the form of a card. The magnetic strip is used as the memory (167) of the account identification device (141) to provide the account information (142). Consumer information, such as account number, expiration date, and consumer name may be printed or embossed on the card. A semiconductor chip implementing the memory (167) and the communication device (159) may also be embedded in the plastic card to provide account information (142) in one embodiment. In one embodiment, the account identification device (141) has the semiconductor chip but not the magnetic strip.

In one embodiment, the account identification device (141) is integrated with a security device, such as an access card, a radio frequency identification (RFID) tag, a security card, a transponder, etc.

In one embodiment, the account identification device (141) is a handheld and compact device. In one embodiment, the account identification device (141) has a size suitable to be placed in a wallet or pocket of the consumer.

Some examples of an account identification device (141) include a credit card, a debit card, a stored value device, a payment card, a gift card, a smartcard, a smart media card, a payroll card, a health care card, a wrist band, a keychain device, a supermarket discount card, a transponder, and a machine readable medium containing account information (142).

Point of Interaction

In one embodiment, the point of interaction (107) is to provide an advertisement to the user (101), or to provide information derived from the transaction data (109) to the user (101).

In one embodiment, an advertisement is a marketing interaction which may include an announcement and/or an offer of a benefit, such as a discount, incentive, reward, coupon, gift, cash back, or opportunity (e.g., special ticket/admission). An advertisement may include an offer of a product or service, an announcement of a product or service, or a presentation of a brand of products or services, or a notice of events, facts, opinions, etc. The advertisements can be presented in text, graphics, audio, video, or animation, and as printed matter, web content, interactive media, etc. An advertisement may be presented in response to the presence of a financial transaction card, or in response to a financial transaction card being used to make a financial transaction, or in response to other user activities, such as browsing a web page, submitting a search request, communicating online, entering a wireless communication zone, etc. In one embodiment, the presentation of advertisements may be not a result of a user action.

In one embodiment, the point of interaction (107) can be one of various endpoints of the transaction network, such as point of sale (POS) terminals, automated teller machines (ATMs), electronic kiosks (or computer kiosks or interactive kiosks), self-assist checkout terminals, vending machines, gas pumps, websites of banks (e.g., issuer banks or acquirer banks of credit cards), bank statements (e.g., credit card statements), websites of the transaction handler (103), websites of merchants, checkout websites or web pages for online purchases, etc.

In one embodiment, the point of interaction (107) may be the same as the transaction terminal (105), such as a point of sale (POS) terminal, an automated teller machine (ATM), a mobile phone, a computer of the user for an online transaction, etc. In one embodiment, the point of interaction (107) may be co-located with, or near, the transaction terminal (105) (e.g., a video monitor or display, a digital sign), or produced by the transaction terminal (e.g., a receipt produced by the transaction terminal (105)). In one embodiment, the point of interaction (107) may be separate from and not co-located with the transaction terminal (105), such as a mobile phone, a personal digital assistant, a personal computer of the user, a voice mail box of the user, an email inbox of the user, a digital sign, etc.

For example, the advertisements can be presented on a portion of media for a transaction with the customer, which portion might otherwise be unused and thus referred to as a "white space" herein. A white space can be on a printed matter (e.g., a receipt printed for the transaction, or a printed credit card statement), on a video display (e.g., a display monitor of a POS terminal for a retail transaction, an ATM for cash withdrawal or money transfer, a personal computer of the customer for online purchases), or on an audio channel (e.g., an interactive voice response (IVR) system for a transaction over a telephonic device).

In one embodiment, the white space is part of a media channel available to present a message from the transaction handler (103) in connection with the processing of a transaction of the user (101). In one embodiment, the white space is in a media channel that is used to report information about a transaction of the user (101), such as an authorization status, a confirmation message, a verification message, a user interface to verify a password for the online use of the account information (142), a monthly statement, an alert or a report, or a web page provided by the portal (143) to access a loyalty program associated with the consumer account (146) or a registration program.

In other embodiments, the advertisements can also be presented via other media channels which may not involve a transaction processed by the transaction handler (103). For example, the advertisements can be presented on publications or announcements (e.g., newspapers, magazines, books, directories, radio broadcasts, television, digital signage, etc., which may be in an electronic form, or in a printed or painted form). The advertisements may be presented on paper, on websites, on billboards, on digital signs, or on audio portals.

In one embodiment, the transaction handler (103) purchases the rights to use the media channels from the owner or operators of the media channels and uses the media channels as advertisement spaces. For example, white spaces at a point of interaction (e.g., 107) with customers for transactions processed by the transaction handler (103) can be used to deliver advertisements relevant to the customers conducting the transactions; and the advertisement can be selected based at least in part on the intelligence information derived from the accumulated transaction data (109) and/or the context at the point of interaction (107) and/or the transaction terminal (105).

In general, a point of interaction (e.g., 107) may or may not be capable of receiving inputs from the customers, and may or may not co-located with a transaction terminal (e.g., 105) that initiates the transactions. The white spaces for presenting the advertisement on the point of interaction (107) may be on a portion of a geographical display space (e.g., on a screen), or on a temporal space (e.g., in an audio stream).

In one embodiment, the point of interaction (107) may be used to primarily to access services not provided by the transaction handler (103), such as services provided by a search engine, a social networking website, an online marketplace, a blog, a news site, a television program provider, a radio station, a satellite, a publisher, etc.

In one embodiment, a consumer device is used as the point of interaction (107), which may be a non-portable consumer device or a portable computing device. The consumer device is to provide media content to the user (101) and may receive input from the user (101).

Examples of non-portable consumer devices include a computer terminal, a television set, a personal computer, a set-top box, or the like. Examples of portable consumer devices include a portable computer, a cellular phone, a personal digital assistant (PDA), a pager, a security card, a wireless terminal, or the like. The consumer device may be implemented as a data processing system as illustrated in FIG. 11, with more or fewer components.

In one embodiment, the consumer device includes an account identification device (141). For example, a smart card used as an account identification device (141) is integrated with a mobile phone, or a personal digital assistant (PDA).

In one embodiment, the point of interaction (107) is integrated with a transaction terminal (105). For example, a self-service checkout terminal includes a touch pad to interact with the user (101); and an ATM machine includes a user interface subsystem to interact with the user (101).

Hardware

In one embodiment, a computing apparatus is configured to include some of the modules or components illustrated in FIGS. 7 and 8, such as the transaction handler (103), the profile generator (121), the media controller (115), the portal (143), the profile selector (129), the advertisement selector (133), the user tracker (113), the correlator, and their associated storage devices, such as the data warehouse (149).

In one embodiment, at least some of the modules or components illustrated in FIGS. 7 and 8, such as the transaction handler (103), the transaction terminal (105), the point of interaction (107), the user tracker (113), the media controller (115), the correlator (117), the profile generator (121), the profile selector (129), the advertisement selector (133), the portal (143), the issuer processor (145), the acquirer processor (147), and the account identification device (141), can be implemented as a computer system, such as a data processing system illustrated in FIG. 11, with more or fewer components. Some of the modules may share hardware or be combined on a computer system. In one embodiment, a network of computers can be used to implement one or more of the modules.

Further, the data illustrated in FIG. 7, such as transaction data (109), account data (111), transaction profiles (127), and advertisement data (135), can be stored in storage devices of one or more computers accessible to the corresponding modules illustrated in FIG. 7. For example, the transaction data (109) can be stored in the data warehouse (149) that can be implemented as a data processing system illustrated in FIG. 11, with more or fewer components.

In one embodiment, the transaction handler (103) is a payment processing system, or a payment card processor, such as a card processor for credit cards, debit cards, etc.

FIG. 11 illustrates a data processing system according to one embodiment. While FIG. 11 illustrates various components of a computer system, it is not intended to represent any particular architecture or manner of interconnecting the components. One embodiment may use other systems that have fewer or more components than those shown in FIG. 11.

In FIG. 11, the data processing system (170) includes an inter-connect (171) (e.g., bus and system core logic), which interconnects a microprocessor(s) (173) and memory (167). The microprocessor (173) is coupled to cache memory (179) in the example of FIG. 11.

In one embodiment, the inter-connect (171) interconnects the microprocessor(s) (173) and the memory (167) together and also interconnects them to input/output (I/O) device(s) (175) via I/O controller(s) (177). I/O devices (175) may include a display device and/or peripheral devices, such as mice, keyboards, modems, network interfaces, printers, scanners, video cameras and other devices known in the art. In one embodiment, when the data processing system is a server system, some of the I/O devices (175), such as printers, scanners, mice, and/or keyboards, are optional.

In one embodiment, the inter-connect (171) includes one or more buses connected to one another through various bridges, controllers and/or adapters. In one embodiment the I/O controllers (177) include a USB (Universal Serial Bus) adapter for controlling USB peripherals, and/or an IEEE-1394 bus adapter for controlling IEEE-1394 peripherals.

In one embodiment, the memory (167) includes one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

OTHER ASPECTS

The description and drawings are illustrative and are not to be construed as limiting. The present disclosure is illustrative of inventive features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/or apparent incompatibility, any combination of various features described in this description is also included here.

The disclosures of the above discussed patent documents are hereby incorporated herein by reference.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A computer-implemented method for updating a reward balance of a reward account associated with a user having an issuer designated financial account, the method comprising:
    receiving a user identification at a transaction terminal, wherein the user identification corresponds to the reward account, wherein a reward host is associated with a first resource including the reward account, and wherein the transaction terminal is connected to an electronic payment processing network;
    transmitting, from the transaction terminal to a communication portal, a first communication comprising the user identification without the first communication being transmitted through a processing system using an existing communication protocol of the processing system, wherein the transaction terminal is coupled to the processing system, and wherein the first communication is configured to not update or extend the existing communication protocol;
    receiving, at the transaction terminal, a response from the communication portal, wherein the response includes a second resource including the issuer designated financial account; and
    transmitting, from the transaction terminal to the processing system, a second communication using a communication protocol configured for the second resource to request an operation on the first resource via the second resource.

2. The method of claim 1, wherein the first communication further comprises a request for a balance of the reward account, and
    wherein the response includes the balance of the reward account.

3. The method of claim 1, wherein the request includes an authorization request transmitted via the electronic payment processing network for a payment made using the issuer designated financial account.

4. The method of claim 1, wherein the communication portal includes:
    a communication link with the processing system, wherein the processing system includes the electronic payment processing network having a transaction handler interconnecting a plurality of acquirer processors and a plurality of issuer processors, wherein the communication portal is coupled with the transaction handler; and
    a communication link with the reward host having the first resource, wherein the communication portal is configured to identify the second resource addressable by the processing system.

5. The method of claim 3, wherein the communication portal is configured to:
    store a data record associating the first resource and the second resource;
    communicate with the processing system to identify the request for the first operation on the second resource communicated to the processing system by the terminal; and
    in response to the request and in accordance with the data record, communicating by the communication portal with the reward host to perform a second operation on the first resource, wherein the second operation on the first resource includes redemption of reward benefits from the reward account to fund the issuer designated financial account for the payment requested by the authorization request.

6. The method of claim 1, wherein the response further includes an exchange rate between a financial currency of the issuer designated financial account and the reward benefits in the reward account.

7. The method of claim 6, wherein the exchange rate is expressed as a ratio and multiplied by a redeemed amount of the reward benefits.

8. The method of claim 1, further comprising periodically communicating with an issuer of the issuer designated financial account and the reward host to settle funds for payments made in the issuer designated financial account using redeemed rewards controlled by the reward host.

9. The method of claim 3, further comprising storing by an issuer processor and the reward host a plurality of authorization requests or corresponding transactions transmitted via the electronic payment processing network for a payment made using the issuer designated financial account.

10. The method of claim 1, further comprising combining multiple authorizations requests and using the combined multiple authorization requests for a combined settlement communication with an issuer of the issuer designated financial account and the reward host for payments made in the issuer designated financial account using redeemed rewards controlled by the reward host.

11. The method of claim 1, wherein the reward host or a plurality of reward hosts coupled thereto contain types of reward benefits selected from the list consisting of points, miles, and virtual cash.

12. The method of claim 11, further comprising prompting the user at the transaction terminal to redeem the reward benefits at the time of purchase of the item from the merchant.

13. The method of claim 12, further comprising prompting the user at the transaction terminal to select the type of reward benefit to apply at the time of purchase of the item from the merchant.

14. The method of claim 1, further comprising:
transmitting, from the transaction terminal to the processing system, a request for a first operation on the second resource.

15. A non-transitory computer storage media storing one or more instructions for updating a reward balance of a reward account associated with a user having an issuer designated financial account, one or more instructions, when executed by at least one processor, cause the at least one processor to:
receive a user identification at a transaction terminal, wherein the user identification corresponds to the reward account, wherein a reward host is associated with a first resource including the reward account, and wherein the transaction terminal is connected to an electronic payment processing network;
transmit, from the transaction terminal to a communication portal, a first communication comprising the user identification without the first communication being transmitted through a processing using an existing communication protocol of the processing system, wherein the transaction terminal is coupled to the processing system, and wherein the first communication is configured to not update or extend the existing communication protocol;
receive, at the transaction terminal, a response from the communication portal, wherein the response includes a second resource including the issuer designated financial account; and
transmit, from the transaction terminal to the processing system, a second communication using a communication protocol configured for the second resource to request an operation on the first resource via the second resource.

16. The non-transitory computer storage media of claim 15, wherein the one or more instructions, when executed by at least one processor, further cause the at least one processor to:
transmit, from the transaction terminal to the processing system, a request for a first operation on the second resource.

17. The non-transitory computer storage media of claim 15, wherein the first communication further comprises a request for a balance of the reward account, and
wherein the response includes the balance of the reward account.

18. The non-transitory computer storage media of claim 15, wherein the request includes an authorization request transmitted via the electronic payment processing network for a payment made using the issuer designated financial account.

19. The non-transitory computer storage media of claim 15, wherein the communication portal includes:
a communication link with the processing system, wherein the processing system includes the electronic payment processing network having a transaction handler interconnecting a plurality of acquirer processors and a plurality of issuer processors, wherein the communication portal is coupled with the transaction handler; and
a communication link with the reward host having the first resource, wherein the communication portal is configured to identify the second resource addressable by the processing system.

20. A computing apparatus for updating a reward balance of a reward account associated with a user having an issuer designated financial account, the apparatus comprising:
at least one network interface;
at least one processor; and
a memory storing one or more instructions that, when executed by the at least one processor, cause the at least once processor to:
receive a user identification at a transaction terminal of a merchant, wherein the user identification corresponds to the reward account, wherein a reward host is associated with a first resource including the reward account, and wherein the transaction terminal is connected to an electronic payment processing network;
transmit, from the transaction terminal to a communication portal, a first communication comprising the user identification without the first communication being transmitted through a processing system using an existing communication protocol of the processing system, wherein the transaction terminal is coupled to the processing system, and wherein the first communication is configured to not update or extend the existing communication protocol;
receive, at the transaction terminal, a response from the communication portal, wherein the response includes a second resource including the issuer designated financial account; and
transmit, from the transaction terminal to the processing system, a second communication using a communication protocol configured for the second resource to request an operation on the first resource via the second resource.

* * * * *